United States Patent [19]

Ninomiya et al.

[11] Patent Number: 4,692,801
[45] Date of Patent: Sep. 8, 1987

[54] BANDWIDTH COMPRESSED TRANSMISSION SYSTEM

[75] Inventors: Yuichi Ninomiya; Yoshimichi Ohtsuka; Yoshinori Izumi; Sei'ichi Goushi, all of Tokyo, Japan

[73] Assignee: Nippon Hoso Kyokai, Tokyo, Japan

[21] Appl. No.: 863,232

[22] Filed: May 14, 1986

[30] Foreign Application Priority Data

May 20, 1985 [JP] Japan .................................. 60-106132
Jan. 27, 1986 [JP] Japan .................................. 61-13631
Jan. 27, 1986 [JP] Japan .................................. 61-13632

[51] Int. Cl.⁴ .............................................. H04N 7/13
[52] U.S. Cl. ..................................... 358/133; 358/105; 358/135; 358/136; 358/138
[58] Field of Search ............... 358/133, 135, 136, 138, 358/105

[56] References Cited

U.S. PATENT DOCUMENTS

| | | | |
|---|---|---|---|
| 4,371,895 | 2/1983 | Koga | 358/136 |
| 4,383,272 | 5/1983 | Netravali | 358/136 |
| 4,551,753 | 11/1985 | Nishizawa | 358/133 |
| 4,620,225 | 10/1986 | Wendland et al. | 358/141 |
| 4,635,114 | 1/1987 | Wendland et al. | 358/140 |

FOREIGN PATENT DOCUMENTS

| | | |
|---|---|---|
| 146713 | 7/1985 | European Pat. Off. . |
| 3233882 | 3/1984 | Fed. Rep. of Germany . |
| 3341298 | 5/1985 | Fed. Rep. of Germany . |

OTHER PUBLICATIONS

"High-Definition Television Systems", Takashi Fujio, Proceedings of the IEEE, vol. 73, No. 4, Apr. 1985, pp. 646-655.
*NHK Laboratories Note*, Ser. No. 304, Sep. 1984.

*Primary Examiner*—Howard W. Britton
*Attorney, Agent, or Firm*—Spencer & Frank

[57] ABSTRACT

In a bandwidth compressed transmission system in which a frequency band of a television signal of 2:1 interlace system is compressed, on an encoder side, by interfield offset subsampling at a first sampling frequency corresponding to a substantially upper limit frequency of the television signal and, after an output signal thus subsampled is applied to a LPF for passing a signal component having an aliased portion resulting from the interfield offset subsampling and having a cut-off frequency substantially equal to one half of the first sampling frequency, by interframe offset subsampling at a second sampling frequency lower than the first sampling frequency and higher than one half of the first sampling, so that a multiplexed subsampled transmission signal which does not include an aliased portion of reverse phase results from the interframe offset subsampling. When decoding, interframe interpolation processing of a multiplexed subsampled transmission signal is performed to obtain a signal for a still picture portion, while intrafield interpolation processing of the same transmission signal is performed to obtain a signal for a motion picture portion. An interframe difference of the transmission signal is detected to obtain a motion detection signal. The signals for still and motion picture are linearly mixed in accordance with the motion detection signal. Motion can be detected completely by utilizing an interframe difference. An arrangement of a receiver can be made simple and improves picture quality.

14 Claims, 51 Drawing Figures

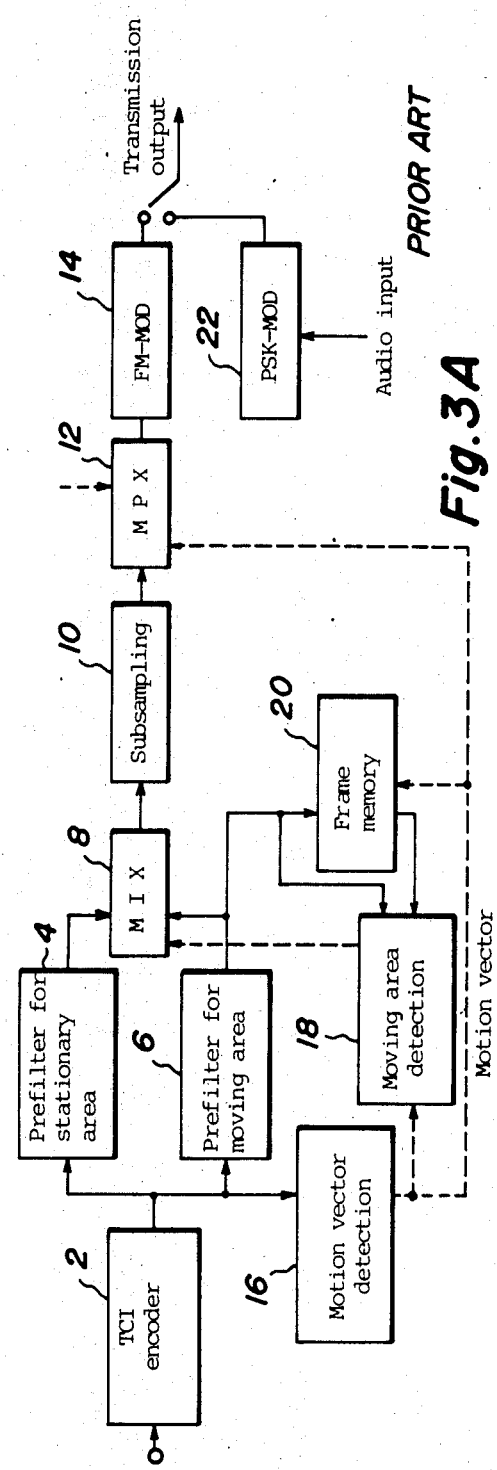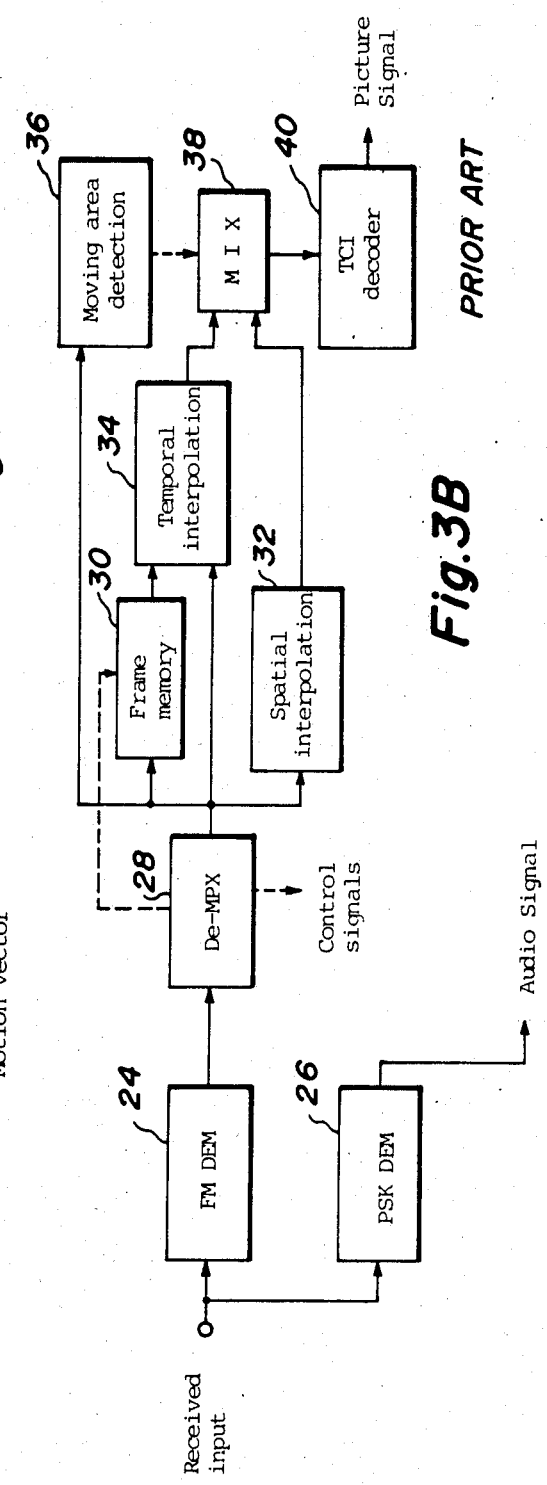
Fig.3A PRIOR ART
Fig.3B PRIOR ART

Motion can be detected by an interframe difference signal

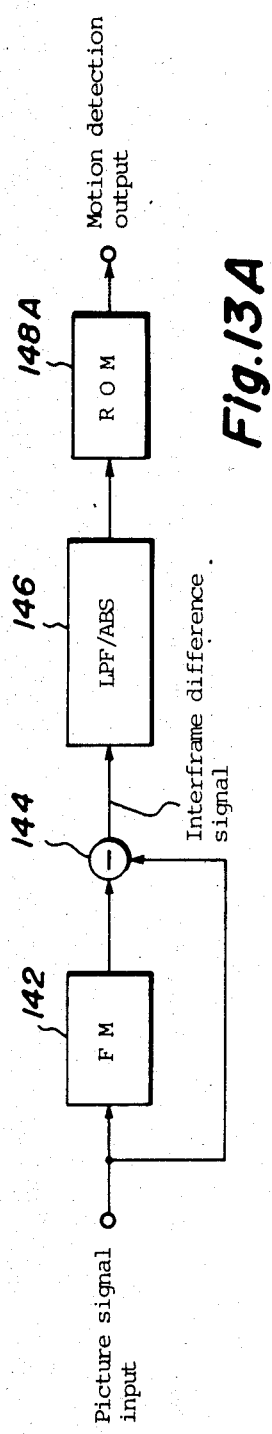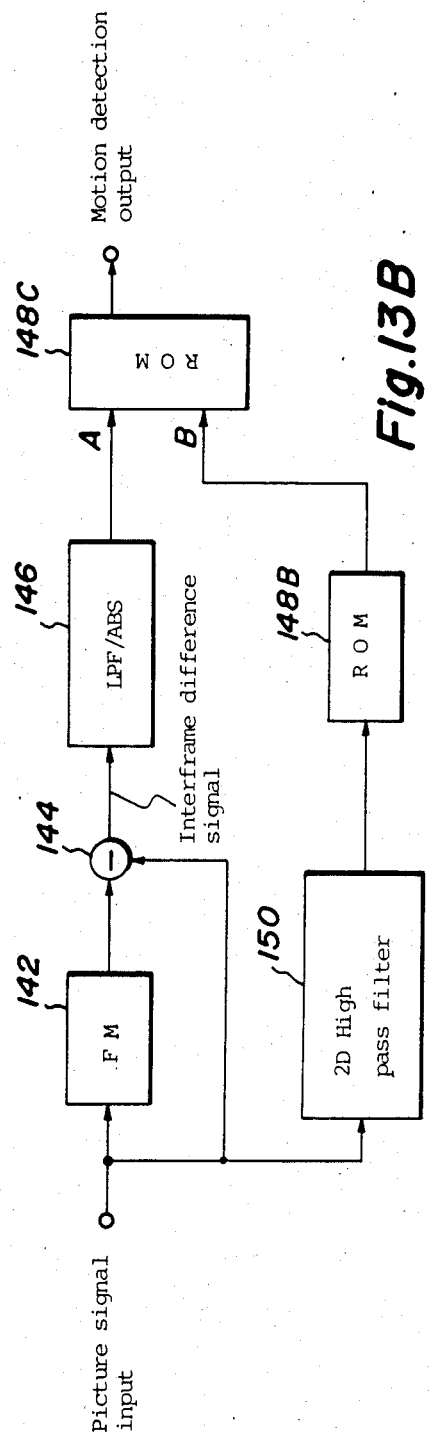

Original sampling
(48.6 MHz)

No aliasing

Interfield offset
subsampling
(24.3 MHz)

Aliasing
($\leq 12$ MHz)

Low pass filter
(12 MHz)

Aliasing

Sampling frequency
conversion
48.6 MHz
→ 32.4 MHz

Interframe/Interline
offset subsampling

Transmission
bandwidth
8 MHz

BANDWIDTH COMPRESSED TRANSMISSION SYSTEM

BACKGROUND OF THE INVENTION

1. Field of the Invention

The present invention relates to a bandwidth compressed transmission system for transmitting a wideband high definition color television picture signal which is rearranged to be well adapted to a narrow band transmission and more particularly to a bandwidth compressed transmission system in which motion detection can be satisfactorily and quickly carried out on the side of a decoder.

2. Description of the Prior Art

NHK (Nippon Hoso Kyokai or Japan Broadcasting Corporation) has proposed a bandwidth compressed transmission system for broadcasting 1125-line HDTV (High Definition Television) pictures with a 5:3 aspect ratio on one channel. This bandwidth compression system is called MUSE (Multiple Sub-Nyquist Sampling Encoding), and is a motion compensated subsampling system.

The above-described MUSE system will be briefly described below. First, sampling and interpolation in the MUSE system will be described.

A combination of the phase-alternating Sub-Nyquist sampling method and a technique used in Motion-Compensated Interframe Coding was applied to bandwidth-reduction for the analog transmission of high-definition television, and equipment for a 1125-line system has been developed.

Table 1 gives the most important characteristics of the MUSE system, and FIG. 1 illustrates the sampling pattern of the system. The sampling is of a multiple dot-interlace type, and the cycle of the sequence is a period of four fields.

For a still picture-area (portions of the field where the picture is still), and HDTV picture can be reconstructed by temporal interpolation, using samples of signals from all four fields. A transmissible region of the spatial-frequency domain for a still picture-area is shown in FIG. 2B.

For a moving picture-area, the final picture is constructed by spatial interpolation, using signals sampled from a single field. If the signals of two or more fields are used to reconstruct a moving picture, the technical quality of the picture is degraded because of multi-line blur.

By using spatial interpolation, the transmissible area is narrowed, as shown in FIG. 2B. This shows that the picture will be blurred in moving portions of the picture with an uncovered background. However, this degradation of quality is not serious, because the human perception of sharpness is not very sensitive to blur in moving portions of the picture.

TABLE 1

| Characteristics of the MUSE system | | |
|---|---|---|
| System | | Motion-compensated multiple subsampling system (Multiplexing of C signal is TCI format) |
| Scanning | | 1125/60 2:1 |
| Bandwidth of transmission baseband signal | | 8.1 MHz (−6 dB) |
| Resampling clock rate | | 16.2 MHz |
| Horizontal bandwidth | (Y) | 20–22 MHz (for stationary portion of the picture) |
| | | 12.5 MHz*(for moving portion of the picture) |
| | (C) | 7.0 MHz (for stationary portion of the picture) |
| | | 3.1 MHz*(for moving portion of the picture) |
| Synchronization | | Positive digital synchronization |
| Audio and additional information | | PCM multiplexed in VBLK using 4-phase DPSK (2048 Kb/s) |

*Values of a prototype receiver: these values should be 16 MHz and 4 MHz, if a perfect digital two-dimensional filter could be used.

In the case of movement caused by panning and tilting, the blur is more noticeable. To avoid this effect of spatial interpolation, motion-compensation is introduced. A vector representing the motion of a scene is calculated for each field by the encoder, and a vector signal is multiplexed in the vertical banking period and transmitted to the receiver. In the decoder, the position of sampled picture-elements of the preceding field are shifted according to the motion vector.

Together with this motion-compensation, temporal interpolation can be applied to panned or tilted scenes with no resultant blur. As shown in FIG. 2B, the maximum vertical transmissible frequency for moving portions of the picture is only half that for still portions because of the 2:1 interlace scanning of the original HDTV signal. If spatial interpolation is used for a still portion of the picture, the maximum transmissible vertical spatial frequency is doubled and equal to $\frac{1}{2}h$, where h is a space between two horizontal scanning lines.

Next, the system construction will be described. Block diagrams of a MUSE transmitter and receiver are shown in FIGS. 3A and 3B. First, the HDTV video signal is encoded into a TCI signal by a TCI encoder 2. One example of a waveform of TCI with a line-sequential chrominance signal is illustrated in FIG. 4. The sampling frequency of the TCI signal is 64.8 MHz. Before the signal is subsampled at 16.2 MHz, prefilters 4 and 6, respectively, for a still and moving areas are applied according to whether the portion of the picture is moving or still. Ideal characteristics for these two filters 4 and 6 are shown in FIGS. 2A and 2B.

A mixer 8 mixes the outputs of the two filters 4 and 6. A mixing ratio of the mixer 8 corresponds to the motion of the picture, which is detected pixel-wise. The mixed output is subsampled by a subsampling circuit 10. Certain control signals, like motion vectors, are combined with the subsampled signal by a multiplexer 12. The combined MUSE signal is then FM-modulated by an FM modulator 14.

An audio signal is by modulated 4-phase DPSK in a PSK modulator 22. The DPSK signals are multiplexed with the video signal by a switch 15, utilizing the vertical blanking interval, after frequency-modulation by the MUSE signal. The control signals are transmitted in the vertical blanking interval and are multiplexed with the baseband signal.

In the receiver, as shown in FIG. 3B, the received signal is demondulated by an FM demodulator 24 and a PSK demodulator 26 to obtain demodulated video and audio signals, respectively. The demodulated video signal is demultiplexed by a demultiplexer 28 to obtain demultiplexed video and control outputs. The video output is applied to a spatial interpolator 32 and a temporal interpolator 34. Here, the two interpolators 32 and 34 are employed, according to whether the portion of the picture is moving or still. That is, moving area is detected by a detector 36 and the detected signal controls the mixer 38. The output from the mixer 38 is applied to a TCI decoder to obtain a video signal corresponding to the original video signal.

A mixer 38 mixes the outputs from the temporal and spatial interpolators 32 and 34. The mixer 38 should be controlled pixel-wise, but in this case, the transmission-rate of the control signal would be so high that the signal could not be transmitted. Motion must, therefore, be detected by the receiver, using the subsampled transmitted signal, and in the following MUSE system proposed by NHK, motion can be detected accurately.

In the MUSE system, motion detection is conducted as follows. Whether a picture element is in a moving portion or a still portion of the picture, its motion can be detected by signal differences with the preceding frame. Exact interframe differences cannot be obtained from the transmitted MUSE signal because it is subsampled, but the difference between a frame and the next frame can be obtained exactly, and used instead of the real differences. In some cases, real movement information is not given by this method, as shown in FIG. 5. The moving portion labelled β cannot be detected from the signal of the next frame but one. The simplest way to overcome this difficulty is to extend temporally the difference in the next frame but one, as shown in FIG. 5.

For almost all HDTV pictures, this motion detecting method can be used, but there are a few exceptions, such as a grid pattern panned at a particular speed, which gives the same partial pictures as the preceding frame and yields no movement information.

For such a scene, a quasi-interframe difference is employed, which is the difference between the current frame and the preceding frame obtained by spatial interpolation, and of course the picture is blurred.

With this method, a still portion of the picture which has a high spatial frequency component may be judged as a moving portion. The use of the quasi-frame difference should be limited to portions in which with a second interframe difference we should not detect the motion. The field signal is therefore separated into about 500 blocks, and which method is to be used for a still or motion picture portion is judged blockwise according to multiplexed transmission of block control signals in the vertical blanking period.

However, on the decoder side of the above-described MUSE system, there arises a problem in the detection of the moving picture area which is required to process signals by discriminating moving picture portions from still picture portions. That is, in the MUSE system, the subsampling cycle consists of two frames so that in the case of detection of motion, "an interframe difference" cannot be used (because of non-existence of an object for which a difference in motion is to be detected in one subsampling cycle). As a result, "a difference between next adjacent frames" must be detected, and consequently motion detection is unsatisfactory. In this specification, the term "interframe difference" is used to designate a signal level difference between, for example, first and second frames and the term "difference between next adjacent frames" is used to designate a signal level difference between, for example, the first and third frames.

The reason why motion detection is unsatisfactory will be described in more detail hereinafter.

With respect to a still picture portion, interpolation can be made by using a signal in the previous frame, whereas such interpolation cannot be applied to a motion picture portion. Consequently, interpolation for motion picture portion is made by using a signal within a frame. Because of these different modes of interpolation, it is required to process segmentation between still and motion regions.

It follows, therefore, that on the decoder (receiver) side, information of moving pictures must be detected with a high degree of accuracy in accordance with the transmitted picture signal, but in the MUSE system, the sampling frequency consists of two frame cycle as described above, so that information of moving pictures must be detected between two next adjacent frames and consequently motion detection is essentially incomplete.

The above-described relationship may be viewed from different standpoint as follows. It is assumed that a signal having a spectrum as shown in FIG. 6A be sampled at 32 MHz (a first sampling frequency) and subsequently at 16 MHz (a second sampling frequency). Then, as shown in FIGS. 6B and 6C, a high frequency component (8 MHz–24 MHz) of the transmitted baseband is aliased. In this case, the low and high frequency components are of course held in interleaving relationship with each other, so that they may not overlap each other. The term "the same phase between frames" used in FIG. 6C refers to a fact that when the high frequency component is aliased, the amplitude of the corresponding signal (for instance, 8–12 MHz) is the same phase in the succeeding frames. A similar definition is also applicable to the term "the same phase between fields".

However, as a result the interframe offset subsampling, i.e., second subsampling, the amplitudes of the high frequency components are opposite phase by 180° in the succeeding frames, so that "an interframe difference" cannot be obtained from the waveform as shown in FIG. 6C. As a result, motion information must be derived from signals between two frames in which amplitudes of the high frequency components are the same phase.

In this specification, the term "interframe/interline offset subsampling" shown in FIG. 6C is used to refer to subsampling carried out by utilizing clocks whose phase is reversed in each frame and line and corresponds to the sampling points in, for instance, the 4n-th field and (4n+2)-th field as shown in FIG. 1.

The term "interfield offset sampling" is used to refer to the sampling carried out by utilizing clocks whose phase is reversed for every field. For instance, this sampling corresponds to the sampling points in the 4n-th field and the (4n+2)-th field and to the sampling points in the 4-th field and the (4n+1)-th field and the (4n+3)-th field shown in FIG. 1.

SUMMARY OF THE INVENTION

In view of the above, one of the objects of the present invention is to provide a bandwidth compression transmission system in which on the decoder side, motion can be detected completely by utilizing an interframe difference.

Another object of the present invention is to provide a bandwidth compression transmission system which can make an arrangement of a receiver simple and improve picture quality considerably.

A further object of the present invention is to provide a decoder which detects correctly a movement of a small picture.

A further object of the present invention is to provide a decoder having a motion detector simple in construction.

A further object of the present invention is to provide a decoder which correctly detects a motion in connection with the color signal.

A further object of the present invention is to provide a decoder which eliminates a nonuniformity of a motion of a picture resulting from the noise reduction process for a MUSE-II transmission signal.

A further object of the present invention is to provide a decoder which eliminates a nonuniformity of a motion of a picture resulting from the decoding of a MUSE-II transmission signal.

A further object of the present invention is to provide a decoder which prevents a reproduced picture from being blurred because a two-dimensional filter for carrying out interfield or intrafield interpolation having a reduced number of taps cannot exhibit ideal characteristics.

A further object of the present invention is to provide a decoder having an interfield interpolation filter which can make hardware compact in size.

The above and other objects of the present invention can be attained by forming a subsample transmission signal which does not include an aliased portion in a low frequency region.

In the first aspect of the present invention, an encoder for compressing a frequency band of a television signal of 2:1 interlace system by carrying out interfield offset subsampling and interframe offset subsampling, comprises: first sampling means for carrying out interfield offset subsampling of a video signal of the television signal at a timing of a sampling pulse having a first sampling frequency corresponding to a substantially upper limit frequency of the video signal; a low pass filter to which an output signal from the first sampling means is applied and for passing a signal component having an aliased portion resulting from the interfield offset subsampling, the low pass filter having a cut-off frequency substantially equal to one half (½) of the first sampling frequency; and second sampling means to which an output signal from the low pass filter is applied and for carrying out interframe offset subsampling of the output signal at a timing of a sampling pulse having a second sampling frequency which is lower than the first sampling frequency and is higher than one half of the first sampling, so that a multiplexed subsampled transmission signal which does not include an aliased portion of reverse phase results from the interframe offset subsampling.

Here, a ratio between the first sampling frequency for carrying out the interfield offset subsampling and the second sampling frequency for carrying out interframe and interline offset subsampling may be set to 3:2.

In the second aspect of the present invention, an encoder for transmitting a television signal by compressing a frequency band thereof by carrying out interfield offset subsampling and interframe offset subsampling, comprises: an interfield prefilter to which an input video signal is applied and for transmitting a signal having a bandwidth corresponding to a first transmission characteristic; first sampling means to which an output signal from the interfield prefilter is applied and for carrying out interfield offset subsampling of the output signal at a timing of a sampling pulse having a first sampling frequency; a low pass filter to which an output signal from the first sampling means is applied and for passing a signal component having an aliased portion resulting from the interfield offset subsampling, and the low pass filter having a cut-off frequency substantially equal to one half (½) of the first sampling frequency; first converter means to which an output signal from the low pass filter is applied and for converting a sampling frequency of the output signal into a different sampling frequency; an interfield prefilter to which the input video signal is applied and for transmitting a signal having a bandwidth corresponding to a second transmission characteristic; second converter means to which an output signal from the interfield prefilter is applied and for converting a sampling signal of the output signal into a different sampling frequency; detector means for detecting a motion of a picture in response to the input video signal; a mixer means for mixing output signals from the first and second converter means in accordance with an output signal from the motion detector means; and a second sampling means to which an output signal from the mixer means is applied and for carrying out interframe offset subsampling of the output signal at a timing of a sampling pulse having a second sampling frequency which is lower than the first sampling frequency and is higher than one half (½) of the first sampling frequency, so that a multiplexed subsampled transmission signal which does not include an aliased portion of reverse phase results from the interframe offset subsampling.

Here, a ratio between the first sampling frequency of the interfield offset subsampling and the second sampling frequency of interframe and interline offset subsampling may be set to 3:2.

In the third aspect of the present invention, a decoder comprises: means for receiving a multiplexed subsampled transmission signal which does not include an interframe aliased portion in a low frequency component; a first interpolation means for carrying out interpolation processing of the multiplexed subsampled transmission signal to obtain a signal for a still picture portion; a second interpolation means for carrying out intrafield interpolation processing of the multiplexed subsampled transmission signal to obtain a signal for a motion picture portion; motion detection means for detecting an interframe difference of the multiplexed subsampled transmission signal to obtain a motion detection signal representative of an amount of picture movement; and a mixer means for linearly mixing the signal for a still picture derived from the first interpolation means and the signal for a motion picture derived from the second interpolation means in accordance with an amount of picture movement in a motion detection signal derived from the motion detection means.

Here, the first interpolation means may comprise an interframe interpolation means for carrying out interframe interpolation of the multiplexed subsampled transmission signal and an interfield interpolation means for carrying out interfield interpolation of the multiplexed subsampled transmission signal.

The mixer means may comprise: a first mixer means and a second mixer means; the first mixer means linearly mixes an output signal derived from the interframe interpolation means and an output signal derived from the second interpolation means in accordance with the amount of picture movement in the motion detecting signal derived from the motion detection means; the interfield interpolation means carries out interfield interpolation processing of a signal derived from the first mixer means; and the second mixer means linearly mixes a signal derived from the first mixer means and a signal derived from the interfield interpolation means in accordance with the amount of picture movement in the motion detection signal.

The motion detection means may comprise: an interframe difference detection means for detecting an interframe difference of the multiplexed subsampled transmission signal; low pass filter means having two selectable cut-off frequencies and for deriving a motion detection signal from an interframe difference signal derived from the interframe difference detection means, the two cut-off frequencies being a frequency including the aliased portion and a frequency not including the aliased portion; a selection means for selecting one of the two cut-off frequencies of the low pass filter means; detection means for detecting a difference between next adjacent frames of the multiplexed subsampled transmission signal; and output means for obtaining a compensation signal in response to a difference signal corresponding to the difference between next adjacent frames derived from the detection means, the compensation signal being applied to the selection means, so that the selection means responds to the compensation signal to select either one of the two cut-off frequencies.

The output means may have inhibit means responsive to a one-frame-delayed signal of the interframe difference signal with respect to the multiplexed subsampled transmission signal for inhibiting the difference signal between next adjacent frames derived from the detection means. The selection means can be so controlled that a frequency which does not include the aliased portion is selected as a cut-off frequency of the low pass filter means when the inhibit means inhibits the difference signal.

The interframe difference detection means may include means for reversing a signal derived from the interframe interpolation means at every half cycle of a clock signal having a interframe subsampling frequency.

The interframe difference detection means may include means for removing the aliased portion in the multiplexed subsampled transmission signal.

In the fourth aspect of the present invention, a decoder comprises: means for receiving a multiplexed subsampled transmission signal which does not include an interframe aliased portion in a low frequency component; a first interpolation means for carrying out interpolation processing of the multiplexed subsampled transmission signal to obtain a signal for a still picture portion; a second interpolation means for carrying out intrafield interpolation processing of the multiplexed subsampled transmission signal to obtain a signal for a motion picture portion; motion detection means for detecting an interframe difference of the multiplexed subsampled transmission signal to obtain a motion detection signal representative of an amount of picture movement; a mixer means for linearly mixing the signal for a still picture derived from the first interpolation means and the signal for a motion picture derived from the second interpolation means in accordance with an amount of picture movement in a motion detection signal derived from the motion detection means; and a signal processing means for applying an output signal derived from the mixer means as a decoded signal to a high frequency component in excess of the low frequency component of the multiplexed subsampled transmission signal and for applying the multiplexed subsampled transmission signal per se as the decoded signal to the low frequency component.

Here, the signal processing means may comprise: separation means for separating the low frequency component and the high frequency component from the multiplexed subsampled transmission signal, the separation means inputting a signal of the high frequency component of the multiplexed subsampled transmission signal to the first and second interpolation means; and adder means for adding the output signal derived from the mixer means to a signal of the low frequency component in the multiplexed subsampled transmission signal derived from the separation means.

The signal processing means may include means for replacing a low frequency component in the output signal derived from the mixer means with the low frequency component signal in the multiplexed subsampled transmission signal.

The above and other objects, effects, features and advantages of the present invention will become more apparent from the following description of preferred embodiments thereof taken in conjunction with the accompanying drawings.

BRIEF DESCRIPTION OF THE DRAWINGS

FIGS. 3A and 3B are block diagrams showing a transmitter and a receiver of the conventional MUSE system;

FIGS. 13A and 13B are block diagrams showing two embodiments of an arrangement of a motion detector in the present invention;

DETAILED DESCRIPTION OF PREFERRED EMBODIMENTS

Embodiments to be described below of the present invention is an improvement over the above described MUSE system and is therefore referred to as "MUSE-II system" in this specification hereinafter. Therefore, an arrangement of a transmitter is referred to as "MUSE-II encoder", while an arrangement of a receiver is referred to as "MUSE-II decoder".

A sampling pattern in the above-described MUSE-II encoder is substantially similar to that in the above-described MUSE system.

That is, in this MUSE-II system, a combination of interfield offset sampling and interframe offset sampling is used. As a result, the interfield offset sampling reduces a resolution in an oblique direction, so that a information is reduced to one half ($\frac{1}{2}$). The interframe offset sampling transmits information of one picture by using two frames, so that the information contained in one frame is reduced to one half ($\frac{1}{2}$).

Figure 1:
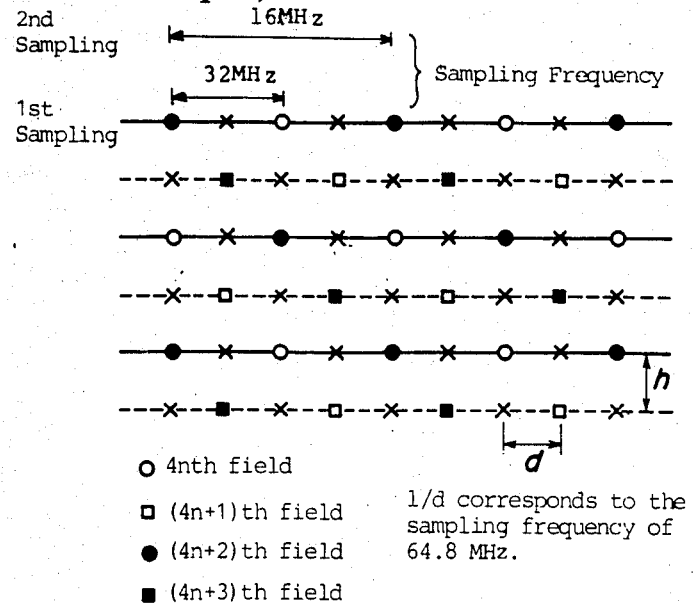
FIG. 1 is an explanatory diagram illustrating a conventional sampling pattern for HDTV system.
Figure 2A:
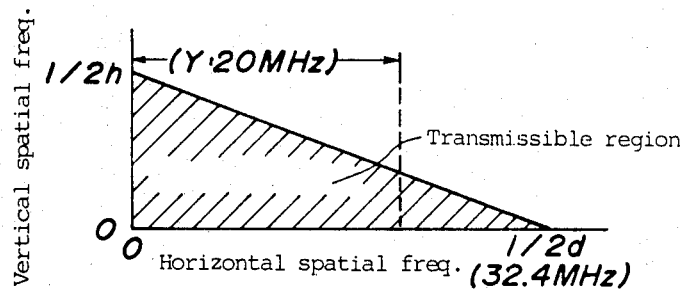
FIGS. 2A and 2B are diagrams illustrating transmissible spatial frequency regions in a conventional MUSE system.
Figure 2B:
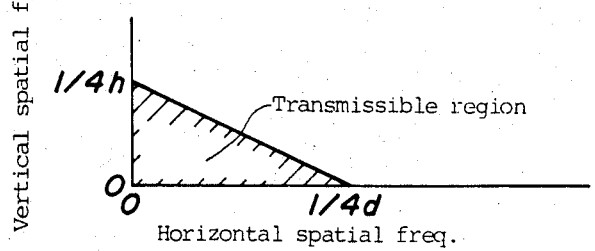
Figure 4:
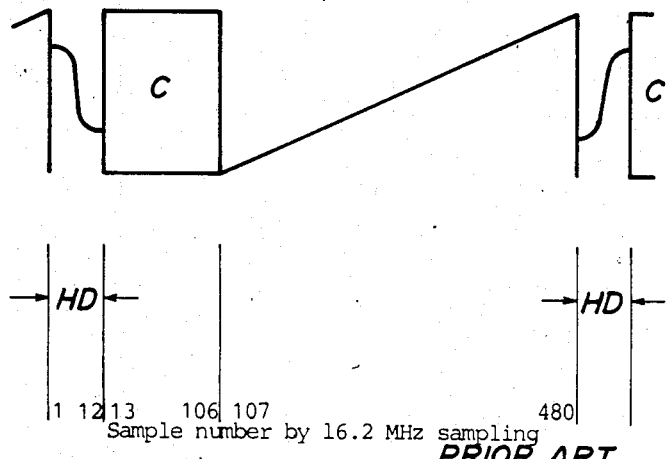
FIG. 4 is a diagram illustrating a transmission signal format in the conventional MUSE system.
Figure 5:
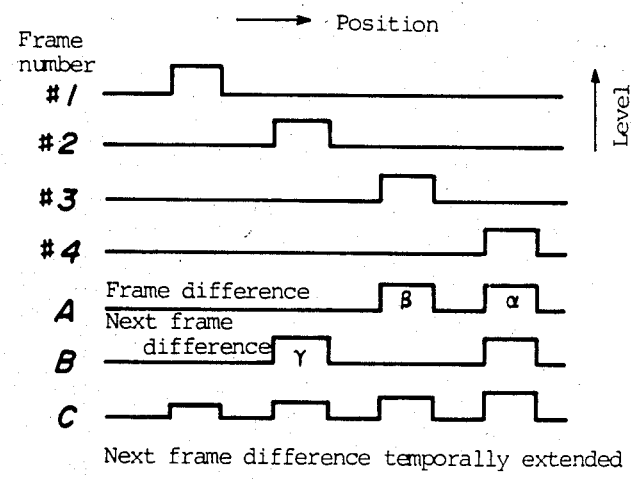
FIG. 5 is a timing chart used to explain a conventional principle for detecting a motion portion.
Figure 6A:
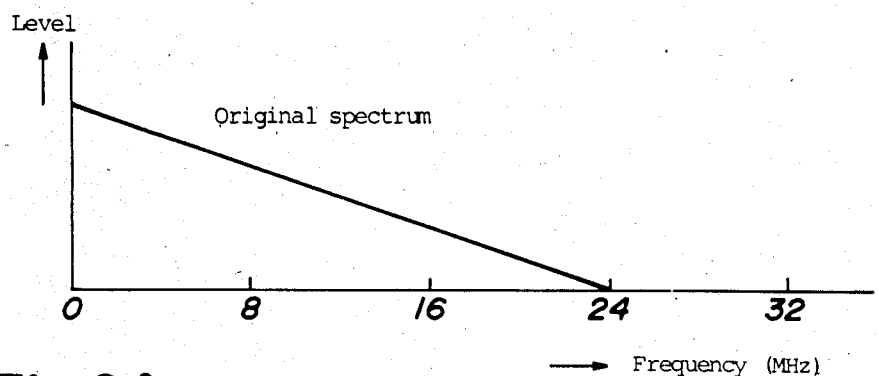
FIGS. 6A-6C are spectrums illustrating transmission spectrums in the conventional MUSE system.
Figure 6B:
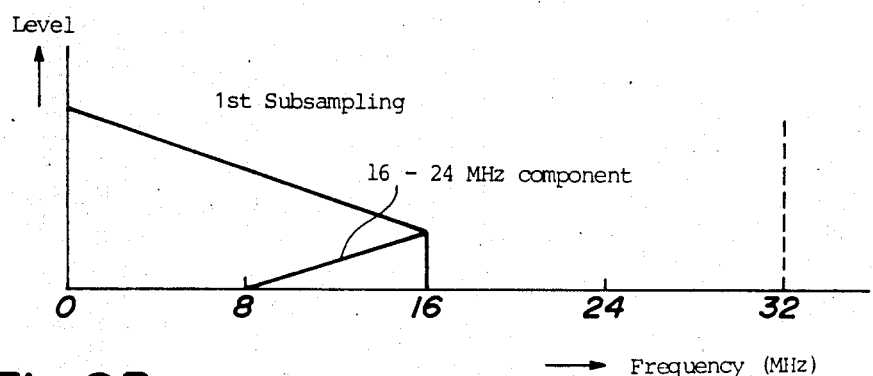
Figure 6C:
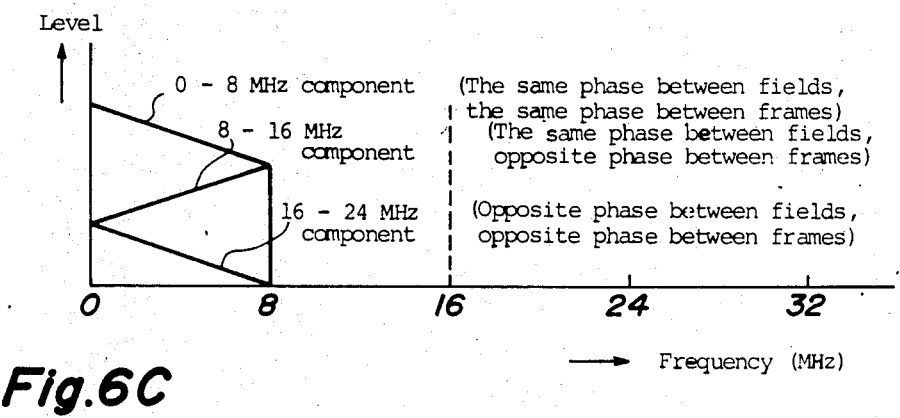
Figure 7A:
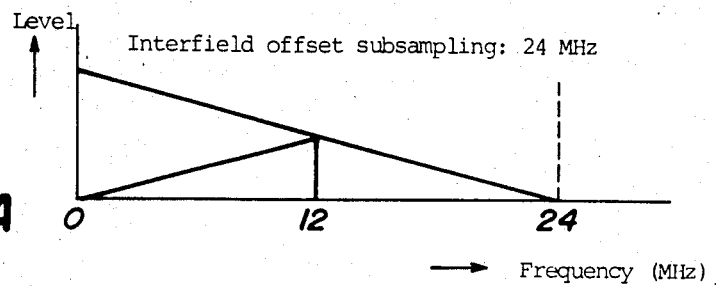
FIGS. 7A-7D are spectrums used to explain fundamental principles of the present invention.

FIGS. 7A-7D illustrate an examle of an encoding procedure in accordance with the present invention. First, as illustrated in FIG. 7A, the signal whose band is limited to 24 MHz is interfield-offset-subsampled at a sampling frequency of 24 MHz, so that a frequency spectrum as illustrated in FIG. 7A is obtained.

Figure 7B:
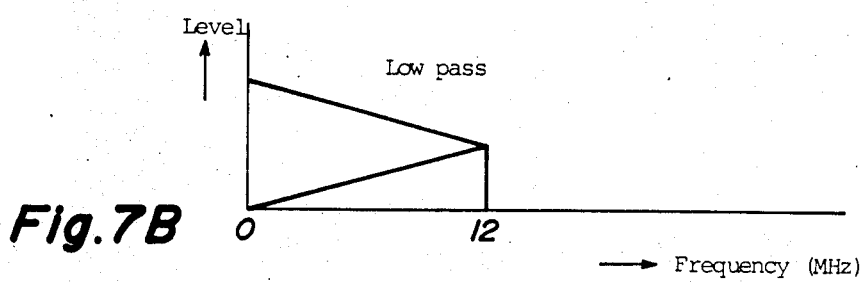
Figure 7C:
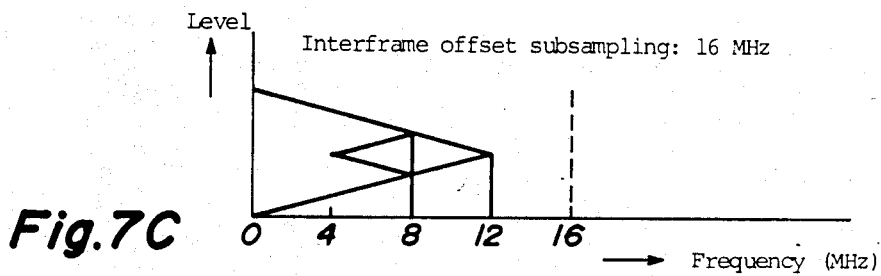
Figure 7D:
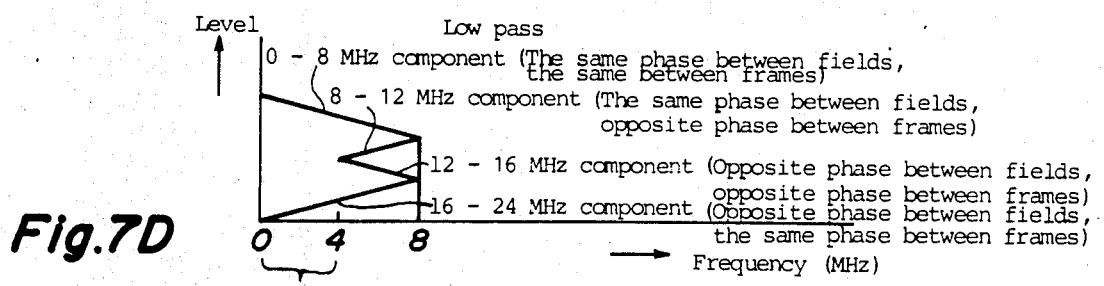

Next, as illustrated in FIG. 7B, the frequency component of the signal thus sampled which is higher than 12 MHz is cut off by a low-pass filter. Then, the signal thus obtained is interframe-offset-sampled at a sampling frequency of 16 MHz. As a result, as illustrated in FIG. 7C, a spectrum which does not include an interframe aliased portion (that is, a component whose amplitude is reversed between the same phase frames) in the 0-4 MHz region of the baseband component (0-8 MHz) can be obtained. In FIG. 7D, the frequency component of the signal thus sampled which is higher than 8 MHz is cut off by a low-pass filter.

Therefore, on the decoding side, when the signal having a spectrum as illustrated in FIG. 7D passes through a low-pass filter having a cut-off frequency of 4 MHz, the decoder can obtain the signal having no aliased portion and "an interframe difference" signal can be obtained in accordance with this signal an dcan be served for motion detection.

A signal having a frequency spectrum as shown in FIG. 7D; that is, the multiplexed subsampled transmission signal having no interframe aliasing portion which is formed by interframe offset subsampling in a low frequency range of a signal to be transmitted (to be referred to as "MUSE-II transmission signal" in this specification hereinafter) is transmitted signal in accordance with the present invention.

The MUSE-II signal is interframe-interpolated and interfield-interpolated to reproduce a signal corresponding to the original signal. According to the present invention, motion can be detected in response to the interframe difference, so that the moving picture portions and still picture portions can be more exactly discriminated from each other and consequently the picture quality of the reproduced picture is improved.

In the case of decoding, the signal as illustrated in FIG. 7B corresponds to the signal which has been interframe-interpolated and has no signal component of 16 MHz. This indicates that regardless of a moving picture portion or a still picture portion, a quasi-signal component of 16 MHz produced when the moving picture portion was erroneously decoded as a still picture portion, can be eliminated. That is, even when the signal obtained by the interframe-interplation is made to pass through a low-pass filter having a cut off frequency of 16 MHz, the inherent information will not be lost). Even when a moving picture portion is erroneously decoded as a still picture portion, a 16 MHz component which produces the most serious interference will not be produced, so that the picture quality is remarkably improved.

Next, with reference to FIGS. 8-15, a more detailed embodiment of the present invention will be described hereinafter.

Figure 8A:
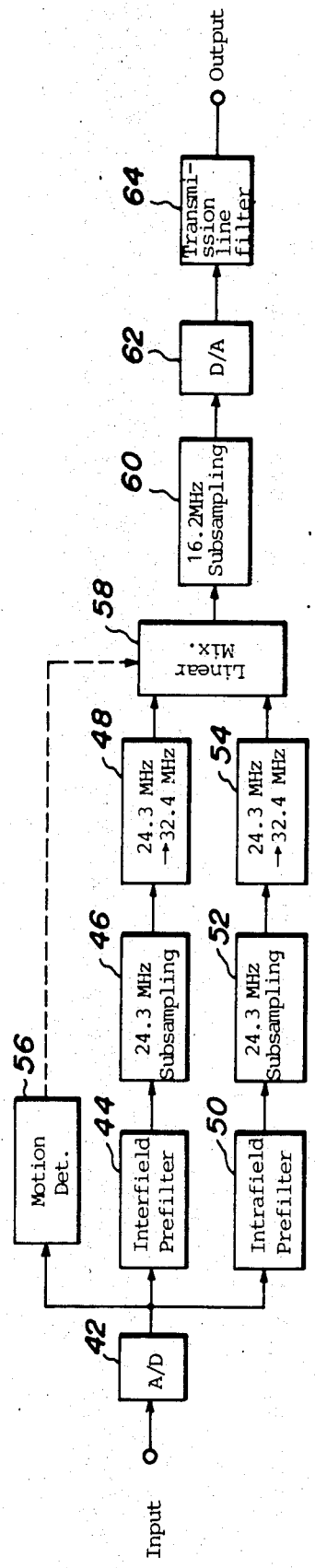
FIGS. 8A and 8B are block diagrams showing an embodiment of an encoder and an embodiment of a decoder arranged in accordance with the present invention, respectively.

FIG. 8A shows an overall arrangement of a MUSE-II encoder for transmitting the MUSE-II signal. In FIG.

Figure 9A:
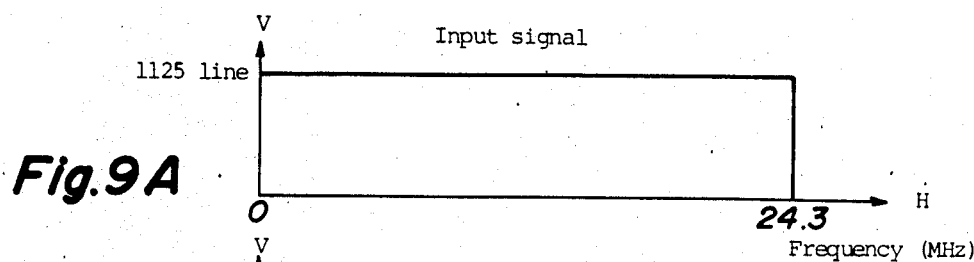
FIGS. 9A-9F are spectrums used to explain modes of operation of the encoder and the decoder shown in FIGS. 8A and 8B.
Figure 9B:
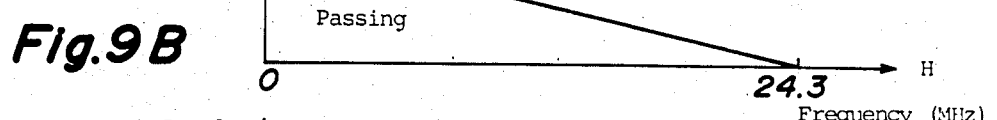

8A, reference numeral 42 designates an analog-to-digital converter for obtaining an input signal as shown in FIG. 9A. Reference numeral 44 denotes an interfield prefilter having output characteristics as shown in FIG. 9B; 46, a sampling circuit for effecting the interfield offset subsampling with respect to the output from the prefilter 44 at the sampling frequency of 24.3 MHz; 48, a sampling frequency converter for converting the sampling frequency from 24.3 MHz to 32.4 MHz. The frequency domain of the signal component, i.e., the spectrum is not changed.

Figure 9C:
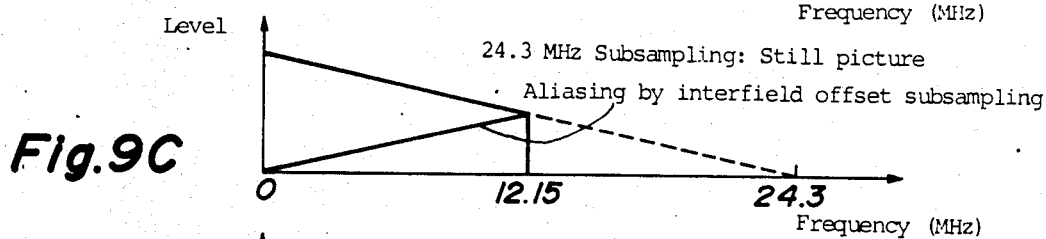
Figure 9D:
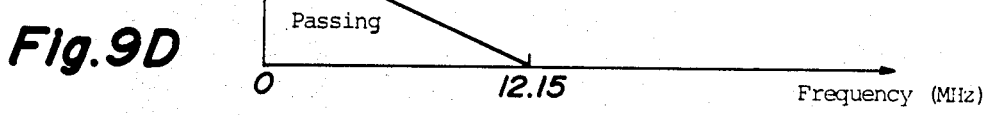

Reference numeral a50 denotes an interfield prefilter having output characteristics as shown in FIG. 9D; 52, a sampling circuit for effecting the interframe offset subsampling with respect to the output from the prefilter 50 at the sampling frequency of 24.3 MHz; 54, a sampling frequency converter which is substantially similar in construction and function to the sampling frequency converter 48.

Reference numeral 56 denotes a motion detector for detecting a motion portion in the output from the analog-to-digital converter 42. Reference numeral 58 denotes a linear mixer responsive to the motion detection output from the motion detector 56 for mixing the output from converter 48 corresponding to a still picture portion and the output from the converter 54 corresponding to a moving picture portion.

Reference numeral 60 denotes a sampling circuit for effecting the interframe offset subsampling with respect to the output from the mixer 58 at the sampling frequency of 16.2 MHz; 62, a digital-to-analog converter for converting the output from the subsampling circuit 60 to an analog signal; and 64, a transmission filter for passing a signal component of the analog signal which is matched to the characteristics of the transmission line The above-described "interfield prefilter 44" is a three-dimensional (horizontal, vertical and time axes) prefilter to which signals of the two succeeding fields are applied. Furthermore, the term "intrafield prefilter 50" is a two-dimensional prefilter (horizontal and vertical axes) to which the signal within one field is applied.

Figures 10A, 10B:
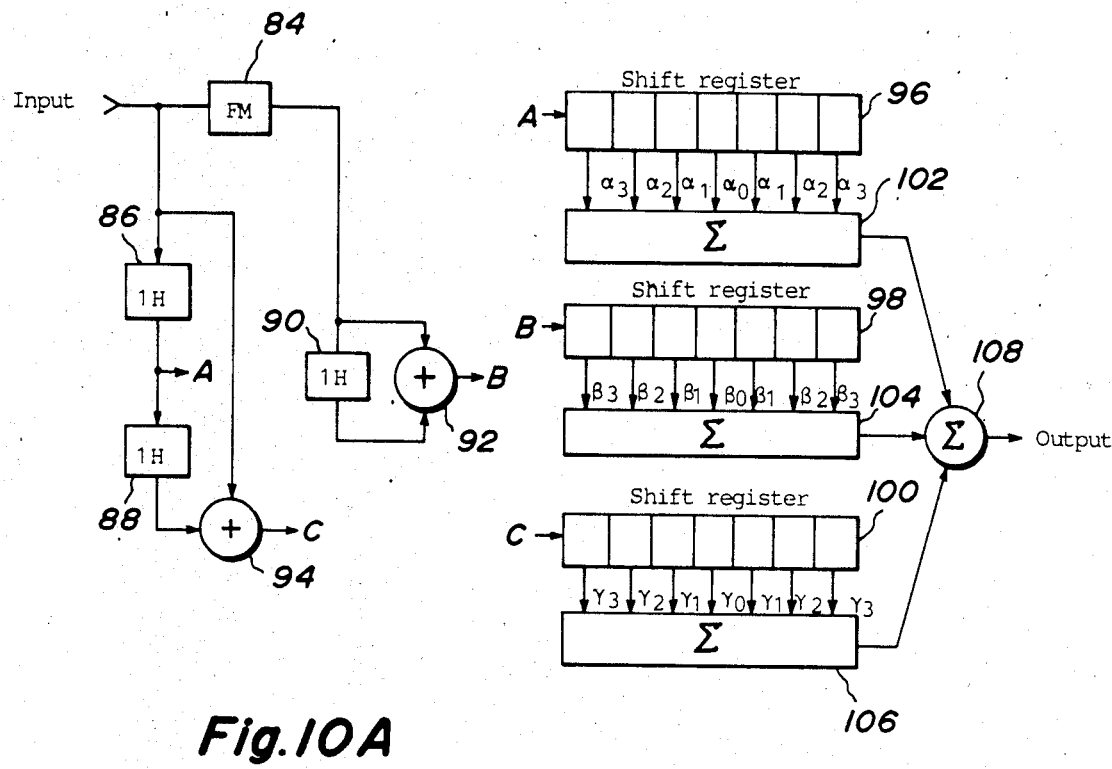
FIG. 10A is a block diagram showing a detailed embodiment of an interfield prefilter to be used in the present invention.
FIG. 10B is a diagram used to explain the interfield prefilter.
Figure 11:
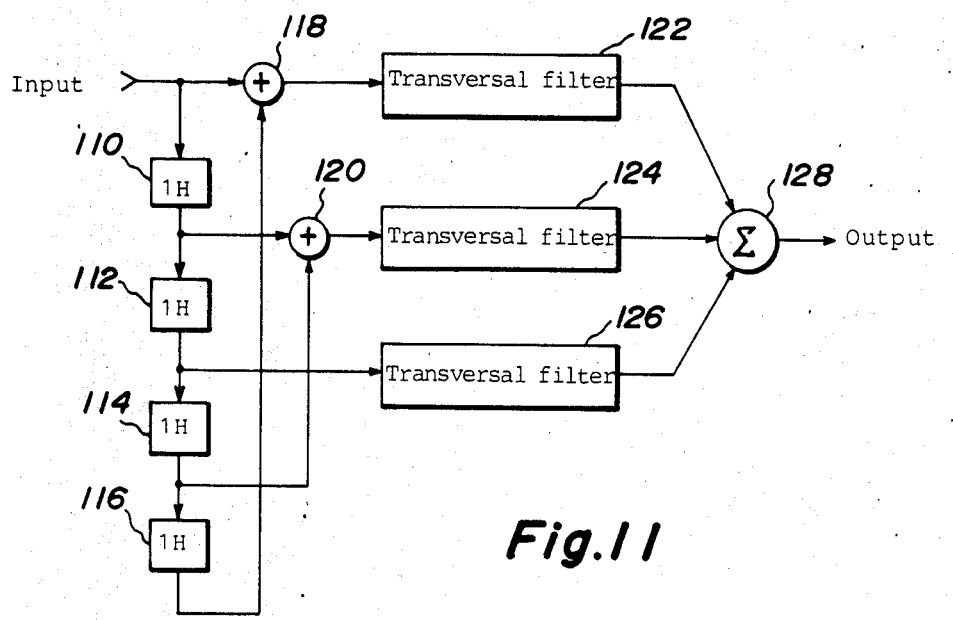
FIG. 11 is a block diagram showing a detailed embodiment of an interfield prefilter to be used in the present invention.

FIG. 10A is a detailed block diagram illustrating an embodiment of the interfield prefilter 44 of five lines and seven taps shown in FIG. 8A. In FIG. 10A, reference numeral 84 denotes a field memory for delaying the input from the analog-to-digital converter 42 by one field (562 lines); 86, 88 and 90, 1H delay lines of one line delay; 92 and 94, adders; 96, 98 and 100, shift registers; 102, 104 and 106, adders for adding the results obtained by multiplying the outputs from the shift registers 96, 98 and 100 by weighting factors $\alpha$, $\beta$ and $\gamma$; and 108, an adder. The above-described weights are values themselves obtained when the two-dimensional impulse responses are sampled at the sampling frequency of 48.6 MHz (1125 lines in the vertical direction) as shown in FIG. 10B. The sum of the weighting factors $\alpha$, $\beta$ and $\gamma$ is 1. FIG. 11 is a detailed block diagram illustrating an embodiment of the intrafield prefilter 50 shown in FIG. 8A. Here, reference numerals 110, 112, 114 and 116 denote 1H delay lines of one line delay for delaying the input from the analog-to-digital converter 42 by 1H sequentially; 118 and 120, adders for adding the input to the output from the delay line 116 and the outputs from the delay lines 110 and 114, to each other, respectively; 122, 124 and 126, transversal filters passing the outputs from the adders 118 and 120 and the delay; and 128, an adder for adding the outputs from the transversal filters 122, 124 and 126.

Figure 12A:
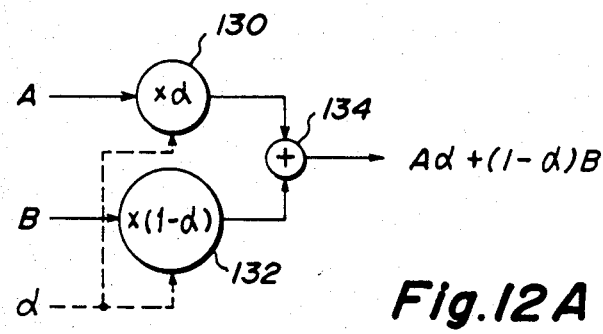
FIGS. 12A and 12B are block diagrams showing two embodiments of an arrangement of a linear mixer in the present invention.

FIG. 12A is a block diagram illustrating the underlying principle of the linear mixer 58 shown in FIG. 8A. The linear mixer 58 mixes the video signals A and B at a mixing ratio $\alpha$ ($0 \leq \alpha \leq 1$), where A: video signal whose moving picture elements have been processed;
B: video signal whose still picture elements have been processed; and
$\alpha$: signal corresponding to a motion. $\alpha$ is 0 in the case of the still picture element, and $\alpha$ is 1 in the case of the moving picture element. This signal is a 4-bit signal representative of various phenomena between the still and moving picture ($0 \leq \alpha \leq 1$)

Reference numerals 130 and 132 denote multipliers for producing $\alpha A$ and $(1-\alpha)B$, respectively; and 134, an adder for producing an output of $\alpha A + (1-\alpha)B$.

Figure 12B:
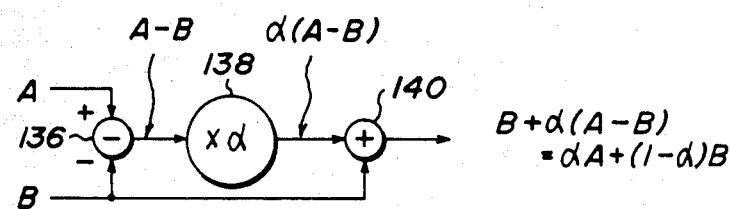

The circuit as shown in FIG. 12A needs the two multipliers 130 and 132 so that its arrangement becomes complicated and expensive. Therefore, in practice, the circuit as shown in FIG. 12B is preferably used.

Here, a subtractor 136 produces an output of $(A-B)$, which is multiplied by $\alpha$ in a multiplier 138. The output $\alpha(A-B)$ from the multiplier 138 is added to the signal B to produce an output of $B + \alpha(A-B) = \alpha A + (1-\alpha)B$.

FIGS. 13A and 13B are detailed block diagrams each illustrating two embodiments of the motion detector 56 shown in FIG. 8A. In FIGS. 13A and 13B, reference numeral 142 designates a frame memory for storing therein the frame video signal from the analog-to-digital converter 42; 144, a subtractor for obtaining an interframe difference signal, i.e., a level difference between frames; 146, a low pass filter/absolute value circuit receiving the interframe difference signal; 148A, 148B and 148C, ROMs for effecting a non-linear conversion; and 150, a high-pass filter for detecting an edge of the input video signal.

Next, the mode of operation of the MUSE-II encoder of the type described above with reference to FIG. 8A will be explained.

(1) The A/D converter 42 samples the input signal at the sampling frequency of 48.6 MHz, so that the output signal thus obtained has a bandwidth as illustrated in FIG. 9A. A horizontal component (H) is plotted along the abscissa, while a signal level is plotted along the ordinate.

(2) In order to process a still picture portion, the interfiled prefilter 44 as illustrated in FIG. 9B is used, so that the high frequency components in the oblique directions in the picture are eliminated (3) The sampling circuit 46 carries out the interfield offset subsampling at the sampling frequency of 1524.8 MHz. As a result, the signals whose frequency is higher than 12.15 MHz are aliased with 12.15 MHz being a center of this aliasing, so that the signal bandwidth as illustrated in FIG. 9C is obtained.

(4) The sampling frequency converter 48 converts the sampling frequency from 24.8 MHz to 32.4 MHz. In this case, as illustrated in FIG. 9C, the signal bandwidth remains unchanged. That is, only the sampling frequency is changed and the frequency bandwidth of the signal remains unchanged.

(5) In order to process a motion picture portion, the intrafield prefilter 50 having a characteristic as illustrated in FIG. 9D limits the bandwidth of a frequency of the horizontal component to 12 MHz.

(6) Thereafter, the subsampling circuit 52 samples the output from the prefilter 50 at the sampling frequency of 24.3 MHz. Since the bandwidth of the output from the prefilter 50 is limited to 12 MHz at (5), no aliasing occurs and the signal bandwidth per se remains unchanged as illustrated in FIG. 9D.

(7) The sampling frequency converter 54 converts the sampling frequency from 24.8 MHz to 32.4 MHz. In this case, the signal bandwidth per se remain sunchanged as illustrated in FIG. 9D.

The processings at (6) and (7) cause no change in the signal bandwidth per se, so that the sampling frequency can be directly converted from 48.6 MHz to 32.4 MHz at (5).

(8) The motion detector 56 first obtains a difference signal of one frame difference between two adjacent frames, as shown in FIGS. 13A and 13B and then an absolute value of the frame difference signal is obtained by the circuit 146. The absolute value is converted to a non-linear a movement detection signal by the ROM 148A or by the ROMs 148B and 148C, so that an amount of the movement is outputted.

(9) In accordance with the amount of the movement thus obtained, the still picture obtained at (4) and the moving picture obtained at (7) are linearly mixed by the mixer 58.

Figure 9E:
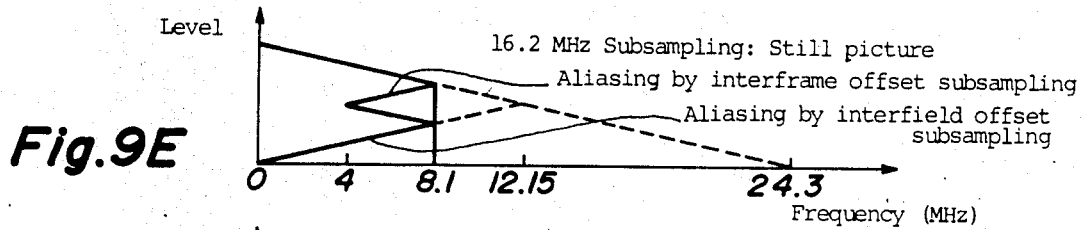
Figure 9F:
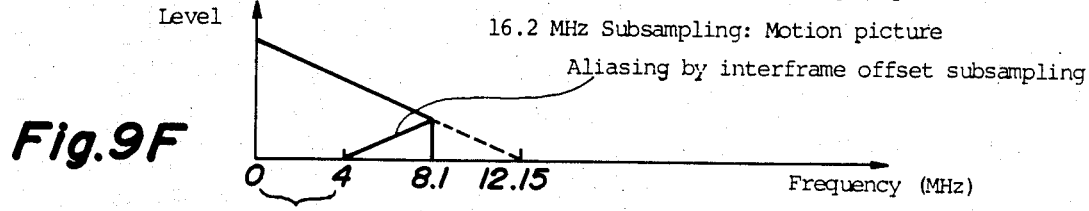

(10) Next, the interframe offset subsampling is carried out at the sampling frequency of 16.2 MHz. As a result, the still picture (FIG. 9C) and the moving picture (FIG. 9D) are reflected or bent at 8.1 Hz as shown in FIGS. 9E and 9F, respectively. FIG. 9D shows the signal bandwidth up to 12.15 MHz, so that an aliasing portion does not occur at a frequency lower than 4 MHz.

(11) Finally, the digital-to-analog converter 62 converts the digital signal from the subsampling circuit 60 to an analog signal. In this case, the signal is transmitted to the transmission line through the transmission-line filter 64 which can obtain a cosine rolloff characteristic at a frequency higher than 8.1 MHz.

Figure 8B:
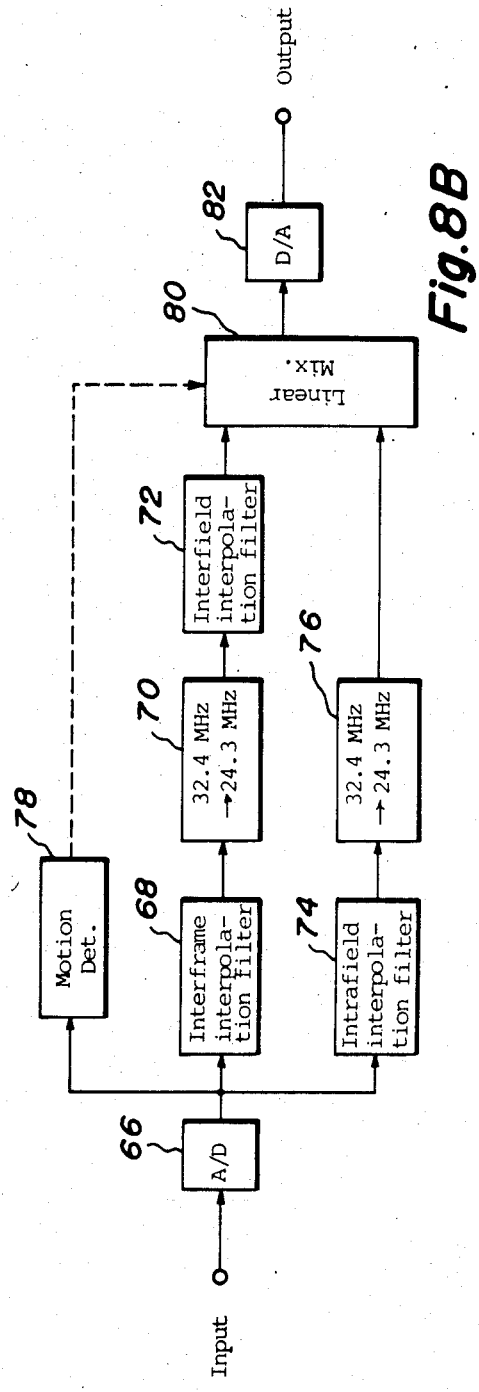

In the receiver, the procedure of the transmitter is reversed as shown in FIG. 8B.

(12) First, an A/D converter 66 performs resampling. In this case, the signal bandwidth of the still picture is illustrated in FIG. 9E, while the signal bandwidth of the motion picture is illustrated in FIG. 9F.

(13) The still picture is processed by an interframe insertion filter 68 in such a way that a picture element which has not been sampled is replaced with a picture element in the preceding frame. Then, the spectrum as illustrated in FIG. 9C is reproduced from the aliased portion as illustrated in FIG. 9E. In this specification, the interframe interpolation means the procedure for obtaining an interpolation signal by using sampled values obtained from the succeeding frames.

(14) A sampling frequency converter 70 converts the sampling frequency from 32.4 MHz to 24.3 MHz, but the signal bandwidth remains unchanged as illustrated in FIG. 9C.

(15) Furthermore, an interfield interplation filter 72 is used so as to reproduce the signal bandwidth as illustrated in FIG. 9B from the aliased portion as illustrated in FIG. 9C.

(16) The motion picture is processed by an intrafield interpolation filter 74, so that the aliased portion as illustrated in FIG. 9D is reproduced from the spectrum as illustrated in FIG. 9F.

(17) Thereafter, a sampling frequency converter 76 converts the sampling frequency from 32.4 MHz to 48.6 MHz. In this case, the signal bandwidth remains unchanged as illustrated in FIG. 9D.

(18) A motion detector 78 limits the input signal bandwidth up to 4 MHz to obtain an interframe difference signal, which in turn is subjected to the non-linear processing so as to obtain an amount of the movement.

(19) In accordance with the amount of the movement thus obtained, the still picture and the motion picture are linearly mixed with each other.

(20) Finally, an analog signal is derived from a digital-to-analog converter 82. In this case, the still picture has the signal bandwidth as illustrated in FIG. 9B, while the motion picture has the signal bandwidth as illustrated in FIG. 9D. When there is a picture element which has moved a little, a signal bandwidth between the signal bandwidths as illustrated in FIGS. 9B and 9D may be obtained.

Figure 14:
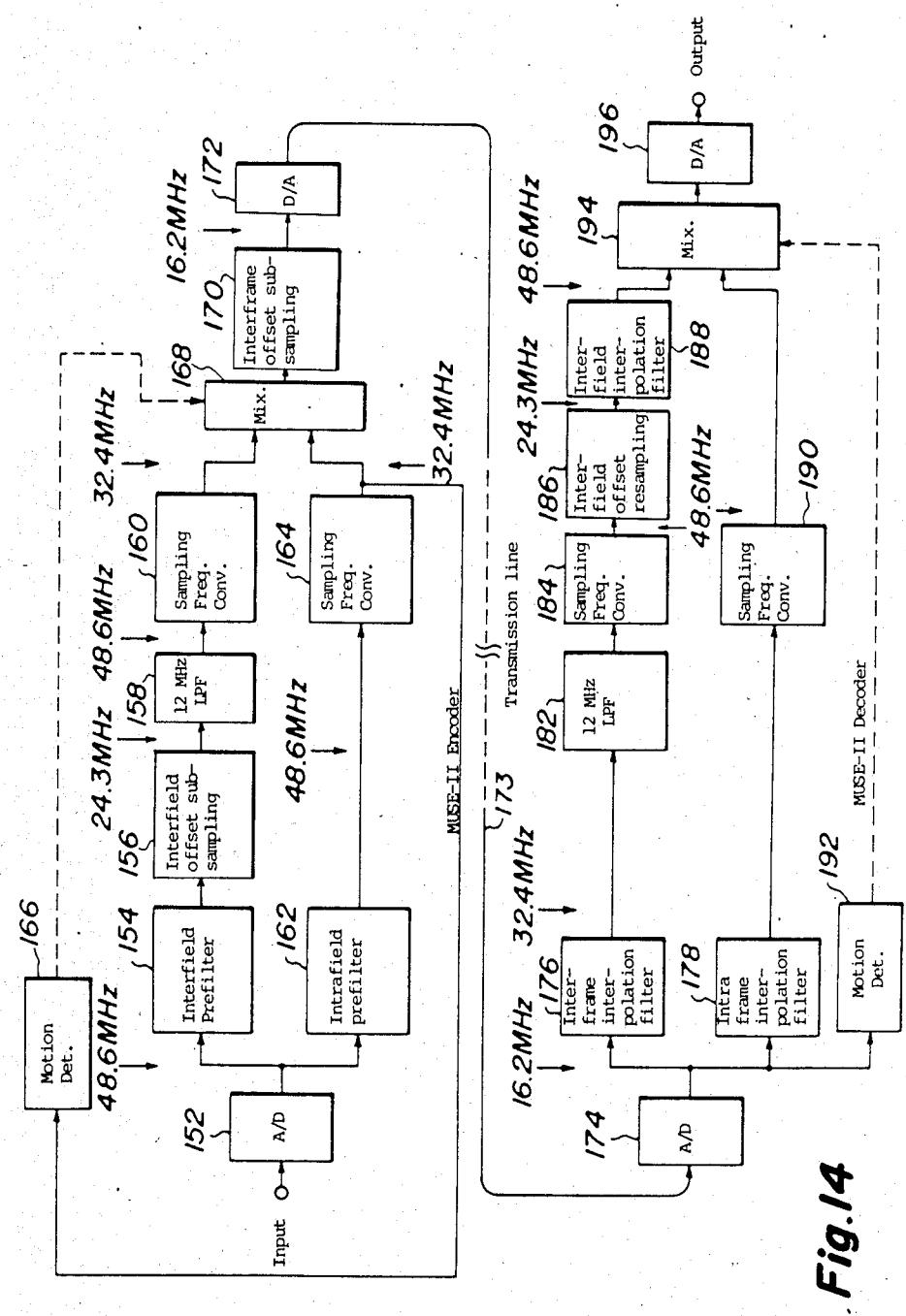
FIG. 14 is a block diagram showing further embodiments of an encoder and a decoder in accordance with the present invention.

FIG. 14 shows a more practical modification of the encoder and decoder shown in FIGS. 8A and 8B. In FIG. 14, the frequencies indicated adjacent to the arrows represent the sampling frequencies.

In the MUSE-II encoder, reference numeral 152 represents an analog-to-digital converter for sampling the input signal at the frequency of 48.6 MHz. Reference numeral 154 denotes an interfield prefilter to which an output from the A/D converter 152 is applied. An interfield offset subsampling circuit 156 subsamples the output from the prefilter 154. The output from the sampling circuit 156 is applied to a sampling frequency converter 160 through a low pass filter (with the cutoff frequency of 12 MHz) 158.

The output from the A/D converter 152 is also applied to an interfield prefilter 162. The output from the prefilter 162 is applied to a sampling frequency converter 164. The output from the sampling frequency converter 164 is applied to a motion detector 166 to obtain an interframe difference signal, which is applied to a linear mixing circuit 168.

The mixing circuit 168 receives the outputs from the sampling frequency converters 160 and 164 to linearly mix these outputs in accordance with an amount of motion in the form of the interframe differnce signal. The output from the linear mixer 168 is applied to an interframe offset sampling circuit 170.

The sampling circuit 170 effects the interframe offset subsampling at the sampling frequency of 16.2 MHz. The sampling output is converted to an analog output by a digital-to-analog converter 172. Then, the digital output is transmitted through a transmission line 173.

Here, the portions 152, 154, 156, 160, 162, 164, 166, 168, 170 and 172 are similar to the portions 42, 44, 46, 48, 50, 54, 56, 58, 60 and 62 in FIG. 8A.

In the modification shown in FIG. 14, unlike the MUSE-II encoder shown in FIG. 8A, the interfield offset subsampling of the motion picture is eliminated, since the bandwidth has been limited already by the interfield prefilter 162, so that the interfield offset subsampling is not requried. In other words, the frequency components have not been changed at all.

According to the modification as shown in FIG. 14, the arrangement is more satisfactory in practice, because the input signal to the motion detector 166 is derived from the output side of the interfield prefilter 162.

The MUSE-II decoder in FIG. 14 has an anlog-to-digital converter 174 which receives the signal transmitted through the transmission line 173, so that the transmitted analog signal is sampled at the frequency of 16.2 MHz to form a digital signal. The digital signal is applied to an interframe interpolation filter 176 and an intrafield interpolation filter 178. The outputs from these filters 176 and 168 are applied to a 12 MHz low pass filter 182 and a sampling freqency converter 190, respectively. The output from the filter 182 is applied to a sampling frequency converter 184. These sampling frequency converters 184 and 190 convert the sampling frequency from 32.4 MHz to 48.6 MHz, without changing the signal bandwidth. The output from the sampling frequency converter 184 is applied to an interfield offset resampling circuit 186 to effect the inter filed offset resampling at the sampling frequency of 24.3 MHz. The resampled output is applied to an interfield interpolation filter 188. The output from the analog-to-digital converter 174 is also applied to a motion detector 192 to obtain an interframe difference signal showing an amount of motion. The outputs from the filter 188 and the converter 190 are applied to a mixer 194 so that the outputs are mixed in accordance with the amount of motion. The output form the mixer 194 is applied to a digital-to-analog converter 196 to obtain a reproduced output.

The arrangement of the MUSE-II decoder shown in FIG. 14 is substantially similar to that of the embodiment shown in FIG. 8B.

FIGS. 15A–15E are sampling structure diagrams used to explain the mode of operation of the MUSE-II encoder shown in FIGS. 15A–15E, the positions indicated by o are sampled while the positions indicated by x are not sampled (but are interpolated on the side of the decoder).

Figure 15A:
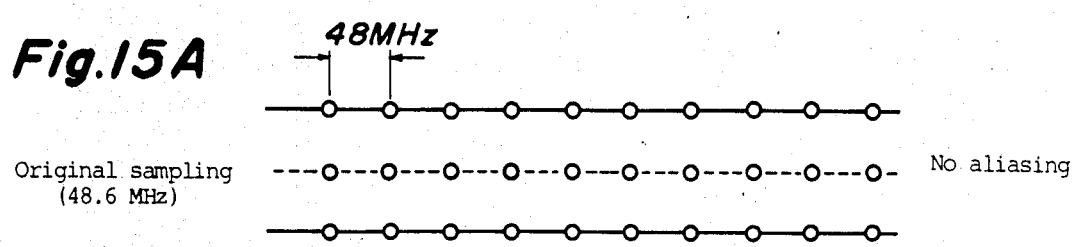
FIGS. 15A-15E are diagrams illustrating sampling patterns used to explain modes of operation of the encoder and the decoder shown in FIG. 14.

As shown in FIG. 15A, the A/D converter 152 samples at 48.6 MHz and of course the sampled signal does not contain an aliased portion.

Figure 15B:
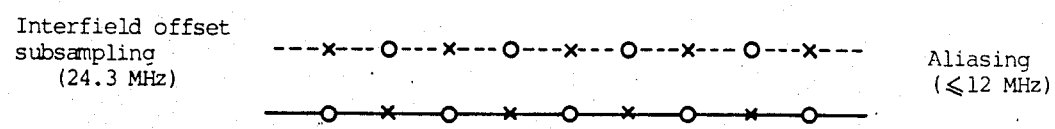

Next in the case of a still picture, the interfield offset subsampling is carried out by the interfield prefilter 154 at the sampling frequency of 24.3 MHz, which is one half ($\frac{1}{2}$) of the previous sampling frequency of 48.6 MHz, so that the sampled points are obtained as shown in FIG. 15B.

Figure 15C:
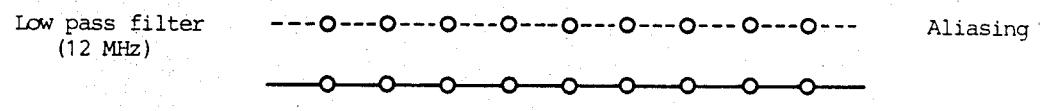
Figure 15D:
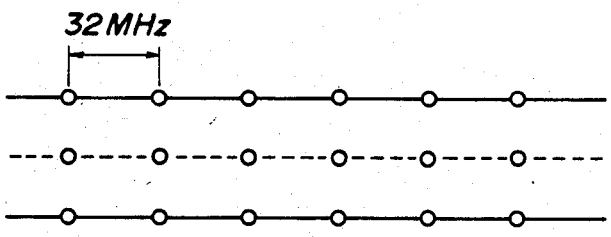

Thereafter, the low pass filter 158 cuts off the frequency higher than 12 MHz so that the points indicated by x in FIG. 15B are interpolated and consequently the sample data as shown in FIG. 15C is obtained. That is, the sampling frequency at which the output data from the low pass filter 158 is sampled is returned again to 48.6 MHz, so that the sampling frequency converter 160 is used to convert the output data into the sampled pattern as shown in FIG. 15A. In this case, only the conversion of the sampling frequency is carried out and the frequency component of the picture or video signal itself remains unchanged.

In the case of a motion picture, the data with the sampling frequency of 32.4 MHz is obtained in a manner substantially similar to that described above.

Figure 15E:
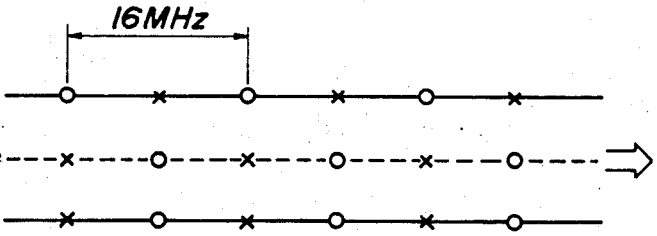

The linear mixer 160 mixes the still and motion pictures and then the interframe/interline offset subsampling is carried out. In this case, the sampling frequency is 16.2 MHz, which is one half ($\frac{1}{2}$) of the above-described sampling frequency, so that the sampled pattern as illustrated in FIG. 15E is obtained.

In the MUSE-II decoder shown in the lower portion in FIG. 14, various interpolation filters 176, 178 and 188 are used to carry out the signal processing in the reversed order of the signal processing carried out on the encoder side. This signal processing has been described with reference to FIGS. 8A and 8B and FIGS. 9A–9F, so that no further detailed description shall be made in this specification.

Figure 16:
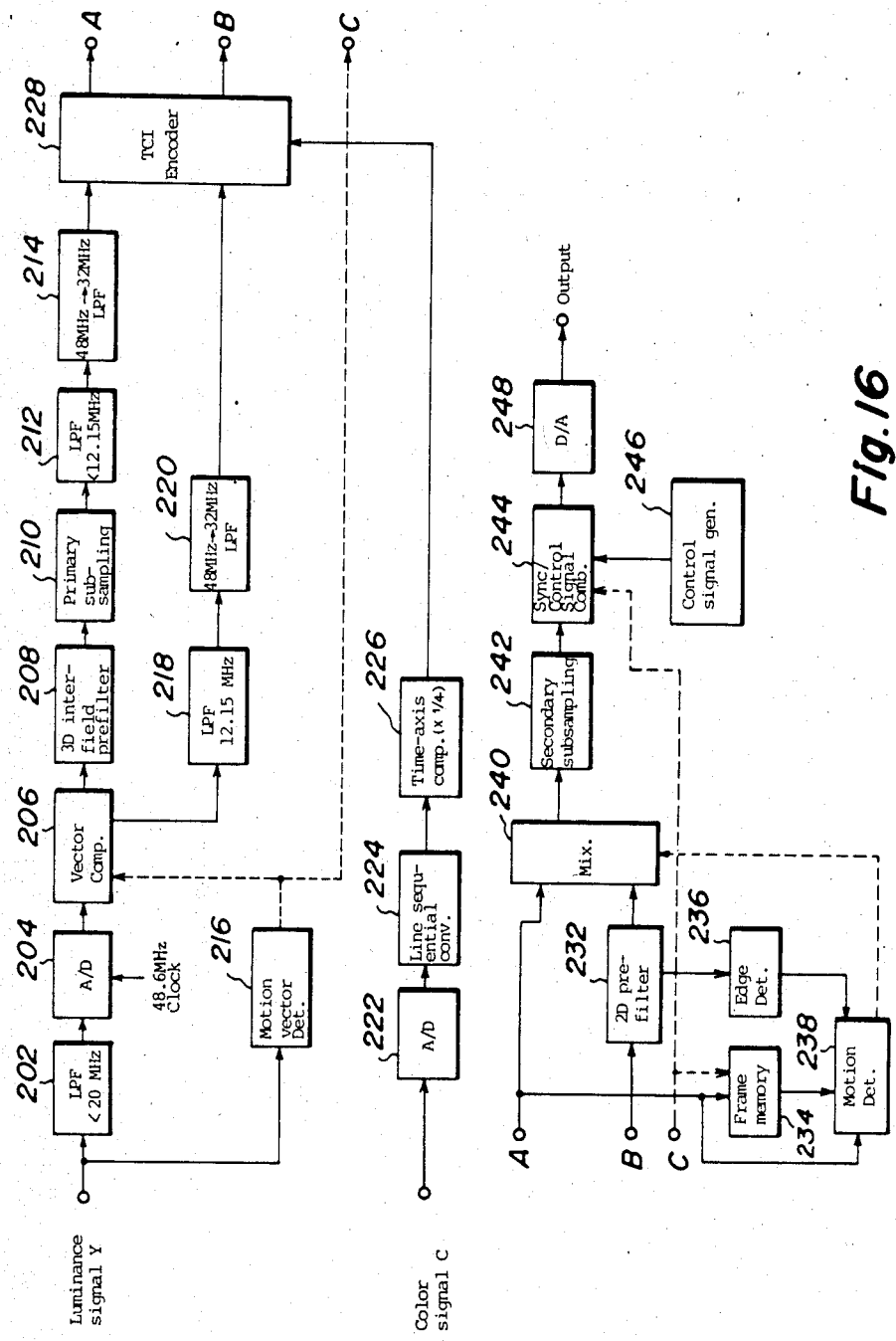
FIG. 16 is a block diagram showing further embodiments of an encoder and a decoder in accordance with the present invention.

FIG. 16 shows another embodiment of the MUSE-II encoder in accordance with the present invention. In this embodiment, the MUSE-II encoder is so designed and constructed that it operates at a low frequency clock to make the hardware compact in size. That is, in the case of processing the luminance signal, the motion vector compensation corresponding to one cycle of 64.8 MHz is carried and then the interfield offset sampling of a still or moving picture is carried out at the sampling frequency of 24.3 MHz through a three-dimensional interfield prefilter. In the case of a motion picture, a signal is derived from a two-dimensional prefilter and the interframe offset sampling of the signal thus obtained is carried out at the sampling frequency of 16.2 MHz.

Referring still to FIG. 16, reference numeral 202 designates a low pass filter (<20 MHz); 304 and 222, A/D converters; 206, a vector compensation circuit carrying out vector compensation with a clock cycle of a frequency of 64.8 MHz; 203, a three-dimensional interfield prefilter; 210, primary subsampling circuit; 212 and 218, low pass filters (<12.15 MHz); 214 and 220, low pass filters for 48 MHz-to-32 MHz conversion (whose detailed arrangement will be shown in FIGS. 17A–17C); 216, a motion vector detector; 224, a line sequential converter; 226, a time axis compression circuit (x $\theta$); 228, a TCI encoder; 232, a two-dimensional prefilter; 234, a frame memory; 236, an edge detector; 238, a motion detector; 240, a mixer; 242, a secondary subsampling circuit; 244, a combining sync and control signal circuit; 246, a control signal generator; and 248, a D/A converter.

Figure 17A:
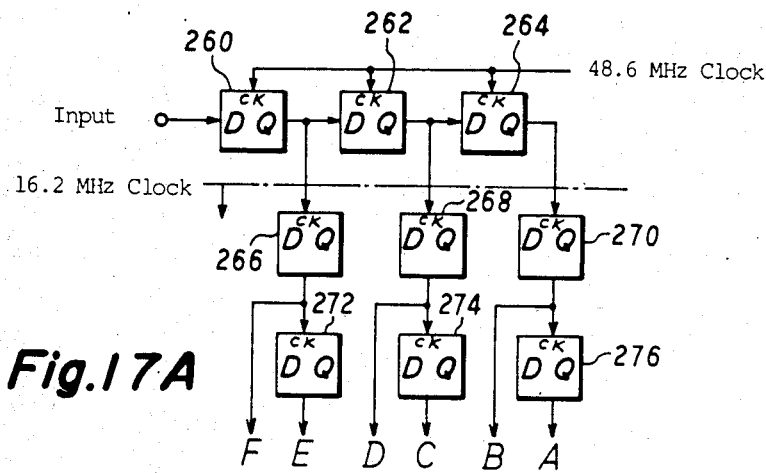
FIGS. 17A and 17C are block diagrams showing low pass filter 214 shown in FIG. 16.
Figure 17C:
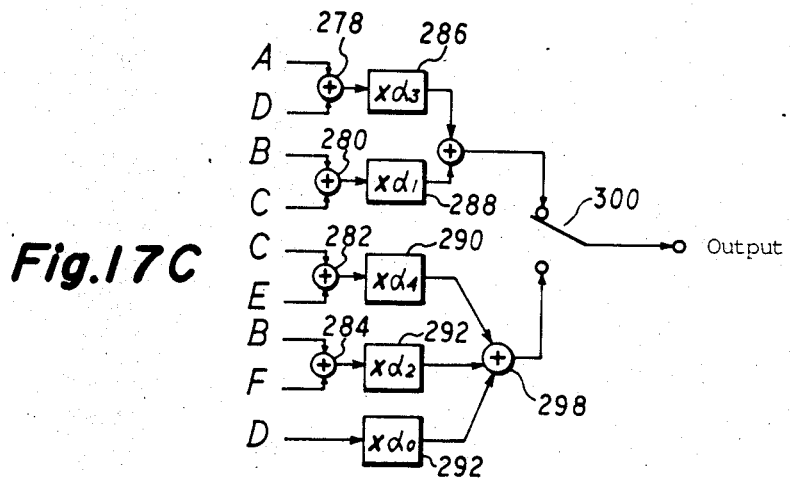
Figure 17B:
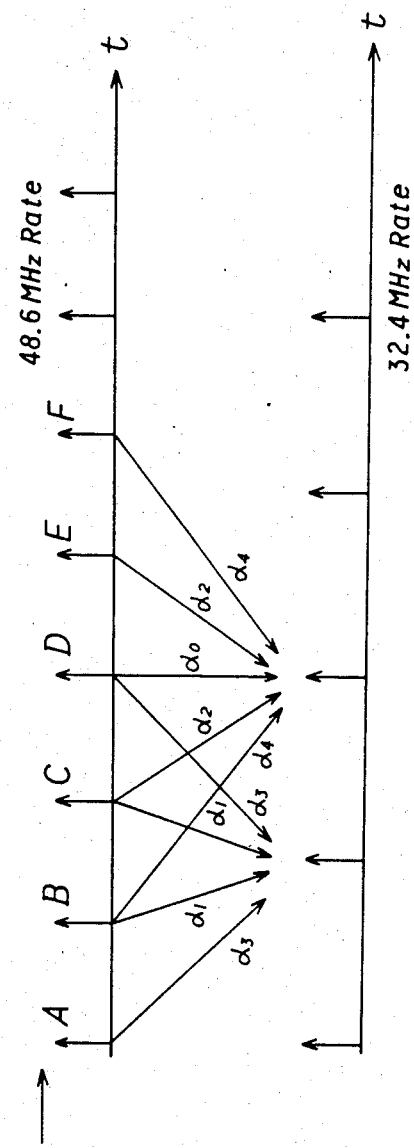
FIG. 17B is an explanatory diagram used to explain the sampling frequency conversion in FIG. 17A.

One embodiment of the low pass filter 214 or 220 is shown in FIGS. 17A and 17B. Here, reference numerals 260, 262 and 264 are D flop-flops driven by 48.6 MHz clock and connected in cascade. The respective outputs from the flip-flops 260, 262 and 264 are applied to D flip-flops 266, 268 and 270 driven by 16.2 MHz clock. The output from the flip-flop 266, 268 and 270 are applied to D flip-flops 272, 274 and 276, respectively.

The outputs A, B, C, D, E and F from the flip-flops 276, 270, 274, 268, 272 and 266 are applied to adders 278, 280, 282 and 284 to obtain outputs (A+D), (B+C), (C+E) and (B+F), respectively. The outputs (A+D), (B+C), (C+E) and (B+F) from the adders 278, 280, 282 and 284 are applied to factor multipliers 286, 288, 290 and 292, respectively, and the output D from the flip-flop 268 is applied to a factor multiplier 294. The multipliers 286, 288, 290, 292 and 294 have multiplying factors of $\alpha_3$, $\alpha_1$, $\alpha_4$, $\alpha_2$ and $\alpha_0$, respectively. These factors $\alpha_0$–$\alpha_4$ are obtained from impulse response of a 16.2 MHz low pass filter sampled at 97.2 MHz.

Next, the mode of operation of the embodiment shown in FIG. 16 will be briefly explained.

Based upon the underlying principle of the above-described MUSE-II system, the luminance signal Y is sampled at 48.6 MHz by the A/D converter 204 after passing through the low pass filter 202 and in this case. Here, the bandwidth of the input signal is restricted lower than 20 MHz by the low pass filter 202.

Thereafter, the vector compensation corresponding to one cycle of 64.8 MHz is carried out by the vector compensation circuit 206 operating at 64.8 MHz under the control of the motion vector detection by the motion vector detector 216. The circuit 206 can be formed as a filter weighing at the position of 64.8 MHz based upon the rate of 48.6 MHz, and accordingly the digital-to-digital conversion can be avoided.

In order to carry out the interfield offset subsampling of the still picture signal, by the subsampling circuit 210, the output from the vector compensation circuit 206 is applied to the three dimensional interfield prefilter 208. After the primary sampling by the subsampling circuit 210, the bandwidth of the signal is restricted to be lower than 12.15 MHz by the low pass filter 212.

The output from the low pass filter 212 is subjected to the velocity conversion from 48.6 MHz to 32.4 MHz. In general, in order to convert 48.6 MHz into 32.4 MHz, first it is converted into 97.2 MHz and is made to pass through the prefilter, whereby 32.4 MHz can be obtained.

A motion picture signal obtained from the motion vector compensation circuit 206 carrying out vector compensation corresponding to one cycle of 64.8 MHz is applied through the low pass filter 218 to the 48 MHz-to-32 MHz conversion low pass filter 220. As a result, the conversion into the rate of 32.4 MHz can be accomplished.

Thereafter, in order to carry out the interframe offset subsampling (the secondary subsampling) of the signal in the secondary subsampling circuit 242, it is previously applied to the two dimensional prefilter 232 in advance through the TCI encoder 228. The output from the prefilter 232 is applied to the mixer 240.

The still or still picture signal is converted to 32.4 MHz by the low pass filter 214 for the 48 MHz-to-32 MHz conversion and then the converted output is applied through the TCI encoder 228 to the mixer 240.

The output A from the TCI encoder 228 is applied to the frame memory 234 and the motion detector 238. The frame memory 234 is controlled by the motion vector detection output from the motion vector detector 216 and the output from the frame memory 234 is applied to the motion detector 238. The output from the prefilter 232 is applied to the edge detector 236 and the edge detection output from the edge detector 236 is also applied to the motion detector 238, so that the motion detector 238 produces a motion detection signal in which an edge of a motion portion is considered. The motion detection signal controls a mixing ratio of the two inputs of the mixer 240.

A color signal C is applied through the A/C converter 222 and the line sequential converter 224 to the time axis compression circuit 226 (x ¼) and is time-axis-multiplexed with the luminance signal by the TCI encoder 228. Thereafter, the color signal is processed in the same manner as the luminance signal.

The signal derived from the secondary sampling circuit 242 is combined with the control signals derived from the control signal generator 246 by the combining sync and control signal circuit 244, which is controlled by the motion vector detection signal from the detector 216, and is converted into an analog signal by the D/A converter 248.

The above-described control signals include those shown in TABLE 2 and are detected by the decoder.

TABLE 2

| bit number | Control Signals | |
|---|---|---|
| | contents | |
| (LSB) 1 | horizontal motion vector | an amount corresponding to one cycle of 64.8 MHz |
| 2 | | an amount corresponding to one cycle of 32.4 MHz |
| 3 | | an amount |

TABLE 2-continued

| bit number | Control Signals | |
|---|---|---|
| | contents | |
| | | corresponding to one cycle of 16.2 MHz |
| 4 | | an amount corresponding to one cycle of 8.1 MHz |
| 5 | | direction (sin) |
| 6 | vertical motion vector | ± 1 line |
| 7 | | ± 2 lines |
| 8 | | direction (sin) |
| 9 | luminance sampling phase | |
| 10 | color sampling phase | |
| 11 | noise reduction control | |
| 12 | bit 11, LSB side | |
| 13 | transmission matching operation flag | |
| 14 | motion detection control (H: low sensitivity) | |
| 15 | blank | |
| 16 | motion condition signal | 000: completely still |
| 17 | | 001: quasi-still. 010: normal |
| (MSB) 18 | | 011-111: forced spatial, interpolation |

Figure 18:
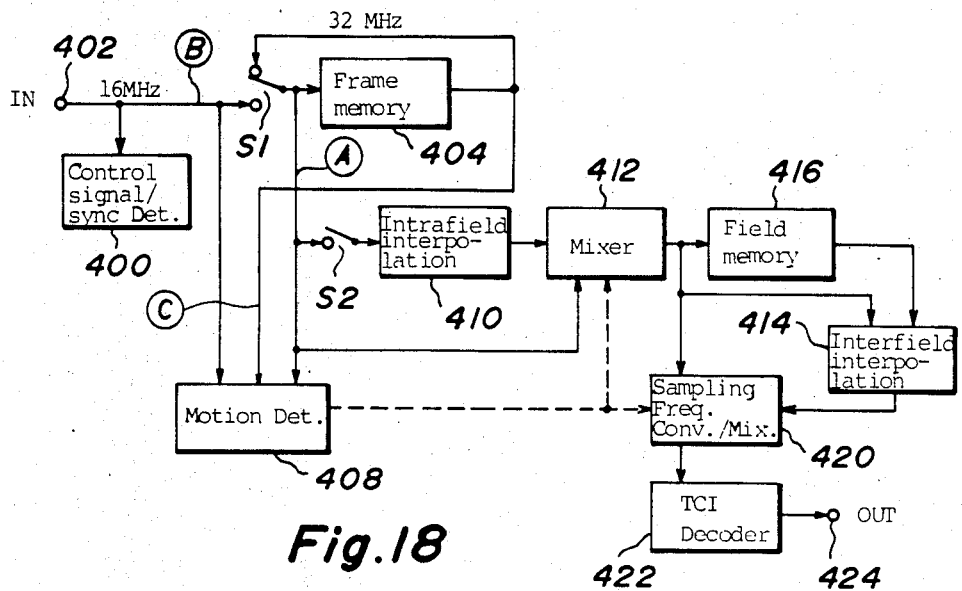
FIG. 18 is a block diagram showing a decoder on the receiver side for receiving a MUSE-II transmission signal.

FIG. 18 shows an embodiment of a decoder on the receiver side adapted to receive the above-described MUSE-II transmission signal.

In FIG. 18, reference numeral 400 designates a control signal/sync detector which generates a sync signal based on the MUSE-II transmission signal (with the interframe sampling frequency of 16 MHz) received at a signal input terminal 402. The sync signal thus generated controls the synchronization of the entire decoder.

S1 denotes a subsample shift switch which inserts a signal from a frame memory 404, which delays the input signal from the terminal 402 by one frame, into the transmission signal applied to the input terminal 402 to generate a signal in which the sampling frequency of 32 MHz is interframe-interpolated. The signal in which the sampling frequency is interframe-interpolated is obtained at point "A" in FIG. 18. When the switch S1 is not a conventional simple switch, but a switch adapted to derive the signal at the frequency of 16 MHz at a suitable mixing ratio, noise reduction can be ensured.

The signal from the switch S1 in which the sampling frequency of 32 MHz is interframe-interpolated is applied to one of the three input terminals of a motion detector 408 and is also applied to an intrafield interpolation circuit 410 through a switch S2 to be operated in synchronism with the switch S1 and to one input terminal of a mixer 412. The intrafield interpolation circuit 410 can be formed by a two-dimensional low pass filter.

The transmission signal from the input terminal 402 and an output C from the frame memory 404 are applied to the other input terminals of the motion detector 408 which in turn responds to the three input signals to generate a signal representative of the detection of the motion in a picture transmitted by the transmission signal.

The switch S2 derives only the signal representative of the sampling points in the present field from the signal from the switch S1 and applies the signal thus derived to the intrafield interpolation circuit 410. The output of the circuit 410 is also applied to the mixer 412.

The mixer 412 responds to the output signal from the motion detector 408 to mix the motion-picture signal from the intrafield interpolation circuit 410 and the still-picture signal from the switch S1 in accordance with the movement of the picture detected by the motion detector.

An interfield interpolation circuit 414 inserts or interpolates the signal which is derived from a field memory 416 by one field delay into the output signal from the mixer 412, so that an interfield interpolation signal with the sampling frequency of 48 MHz is obtained from the circuit 414. The interfield interpolation signal thus obtained is applied to one of the two input terminals of a sampling frequency converter/mixer 420.

The signal with the sampling frequency of 32 MHz derived from the mixer 412 is applied to the other input terminal of the sampling frequency converter/mixer 420, so that the signal is converted into a signal with a sampling frequency of 48 MHz and is mixed with the output signal from the interfield interpolation circuit 414 in accordance with an amount of the movement of the picture obtained as a motion detection signal. The output from the sampling frequency converter/mixer 420 is applied to a time-compressed integration decoder 422 (which is referred to as "TCI decoder" hereinafter) which converters the input signal into a desired television signal, which is derived from an output terminal 424.

Figure 19:
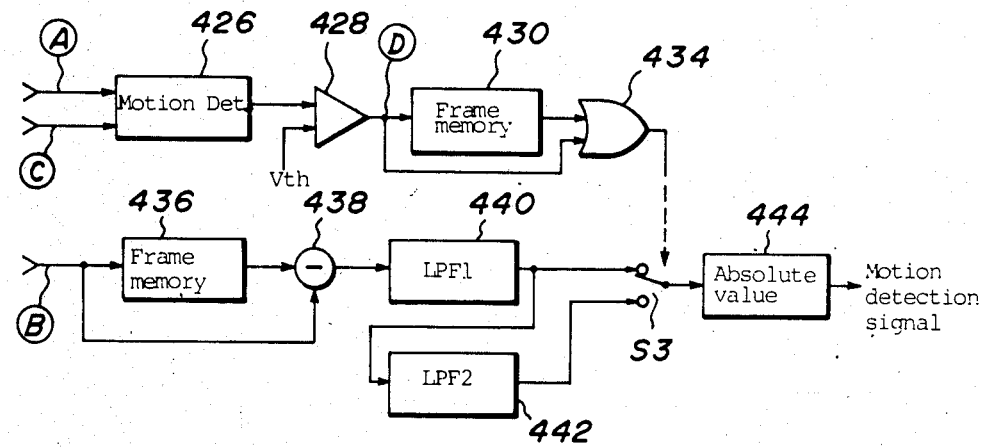
FIG. 19 is a block diagram showing a specific embodiment of an arrangement of a motion detector shown in FIG. 18.

FIG. 19 shows a practical embodiment of the motion detector 408 shown in FIG. 18.

In FIG. 19, reference numeral 426 designates an interframe motion detector which detects a motion between first and third frames and the signals A and C as shown in FIG. 18 are applied to the input terminals thereof, respectively. Reference numeral 428 denotes a comparing circuit for thresholding the output signal from the detector 426 with a suitable threshold level Vth to obtain one bit signal.

Reference numeral 430 denotes a frame memory for storing the signal D from the threshold circuit 428 for one frame period; and the outputs from the threshold circuit 428 and the frame memory 430 to an OR gate 434. In response to the output signal from the OR gate 434, a switch S3 is actuated.

Reference numeral 436 designates a frame memory for storing the input signal "B" from the input terminal 402 for one frame period. The input signal B as shown in FIG. 18; that is, the transmission signal with the sampling frequency of 16 MHz is applied not only to the frame memory 436 but also to one of the two input terminals of a subtractor 438. The output from the frame memory 436 is applied to the other input terminal of the subtractor 438.

As a result, the subtractor 438 generates an interframe difference signal which is applied to one of the two input terminals of the switch S3 through a first low pass filter 440 having such a broad bandwidth characteristic that a level of the signal drops by 6 dB at 8 MHz, for instance. The output terminal of a second low pass filter 442 with a narrow bandwidth connected in cascade to the first low pass filter 440 is connected to the other input terminal of the switch S3. The first and second low-pass filters 440 and 442 co-operatively produce a characteristic having no response at a frequency higher than 4 MHz.

The output signal derived from the switch S3 is applied to an absolute value circuit 444 which in turn forms an output signal representative of an absolute value of the input signal.

In the motion detector of the type shown in FIG. 19, when a difference between two frames indicates motion detection the use of the low pass filter 440 with a broad bandwidth permits the mixture of a component higher than 4 MHz into the bandwidth of the interframe difference signal. As a result, a motion detection signal by which fine movements in the picture is completely detected can be produced.

Referring back to FIG. 18, the signal C includes a signal component which is delayed by two frames relative to the signal B. The transmission signal which is applied to the frame memory 404 through the switch S1 from the input terminal 402 is circulated twice through a circuit consisting of the frame memory 404 and the switch S1. Accordingly, the signal C includes the one-frame delayed signal corresponding to the signal B and the two-frame delayed signal corresponding to the signal B in dot sequence at a rate of 32.4 MHz. The signal A includes the signal B and the one-frame delayed signal corresponding to the signal B in dot sequence at a rate of 32.4 MHz.

The detector 426 for detecting the difference in motion between next adjacent frames obtains a difference between the signals A and C remove the one-frame delayed signal corresponding to the signal B, so that a difference between next adjacent frames is obtained. When the level of the output signal from the detector 426 is in excess of a predetermined threshold level Vth set in the threshold circuit 428, the switch S3 is connected to the output terminal of the first low pass filter 440 in response to the ON output signal from the OR gate 434, so that the interframe difference signal having a broad bandwidth is used to detect a motion.

The signal representative of the difference between next adjacent frames from the threshold circuit 428 and the output signal from the frame memory 430 which is delayed by one frame behind the signal representative of the difference between next adjacent frames are applied to the OR gate 434 in order to prevent a misjudgement that a motion picture is erroneously judged as a still picture due to the fact that the switch S3 is actuated in response to the difference between next adjacent frames.

The frame memory 430 is used to process a one-bit signal and the sampling frequency is low (16.2 MHz). As a result, there arises no problem concerning a size of the circuit. While the output signal from the OR gate 434 is not sufficient to determine the switching of the switch S3, sufficient effects can be obtained for almost all the pictures according to the present invention.

Figure 20:
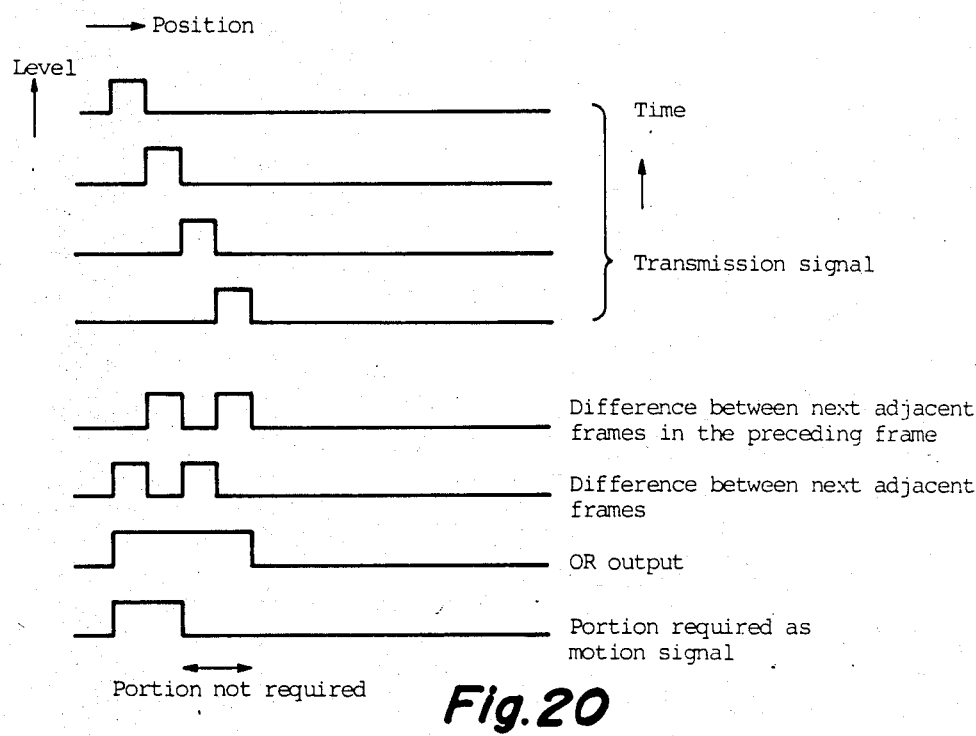
FIG. 20 is a timing chart illustrating the relationship between an output signal from an OR gate and a transmission signal in a circuit for generating a signal for switching the switch S3 shown in FIG. 19.

FIG. 20 illustrates a relationship between the transmission signal and the output signal from the OR gate 434 in the circuit for generating the signal for actuating the switch S3 shown in FIG. 19. As illustrated in FIG. 20, the transmission signal indicates that the position of the picture is moving as the time elapses. In response to such a transmission signal, the difference between next adjacent frames in the preceding frame and the difference between next adjacent frams are derived as the output signal from the threshold circuit 428 shown in FIG. 19 and the OR output signal between these different signals can be obtained. The OR output signal contains a portion which is not necessary for the interframe difference. As a consequence, when a large body is moving fast, some aftereffect is left in the output signal of the decoder shown in FIG. 18.

Figure 21:
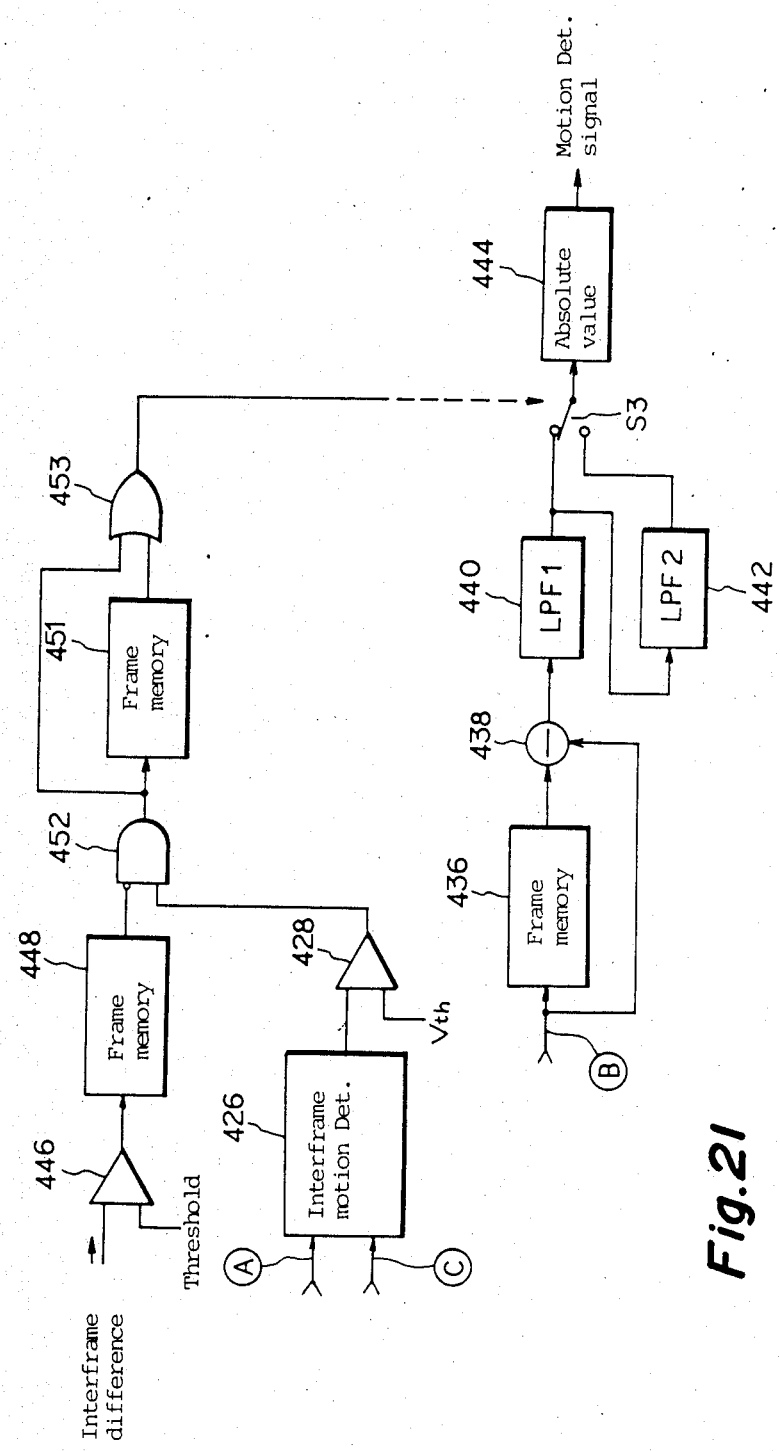
FIG. 21 is a block diagram showing another circuit for generating a signal for switching the switch S3 shown in FIG. 19.

From the standpoint of the picture quality, while this after-effect does not present any serious problem, an embodiment of a circuit for eliminating such after-effect is shown in FIG. 21.

Referring now to FIG. 21, reference numeral 446 designates a threshold circuit; 448 and 451, frame memories; 452, an inhibit gate; and 453, an OR gate. In response to an OR output signal from the OR gate 453 which receives an output signal from the inhibit gate 452 and a one-frame delayed signal from the frame memory 448, the switch S3 shown in FIG. 19 is actuated. The output signal (See FIG. 19) from the threshold circuit 428 is applied as an interframe difference between next adjacent frames to the non-inverting input terminal of the inhibit gate 452.

The output signal from the subtractor 438 shown in FIG. 19 is, for instance, applied as an interframe difference to one input terminal of the threshold circuit 446 which in turn compares the input signal with a suitable threshold level and the output signal from the threshold circuit 446 is applied to the frame memory 448. The signal which has been delayed by one frame by the frame memory 448 is applied to the inhibit gate 452. The inhibit gate 452 also receives the output signal D from the threshold circuit 428 to inhibit the output signal from the frame memory 448. The output from the inhibit gate 452 is applied to the frame memory 451. The outputs from inhibit gate 452 and the frame memory 451 are applied to the OR gate 453.

In response to the OR output signal from the OR gate 453 which is actuated in the manner described above, the switch S3 is connected to the output terminal of the first low pass filter 440.

The object of the detection of the difference between next adjacent frames is to assist the detection of the motion of the picture in the signal which is not detected by the interframe difference, so that when the motion of the picture in the transmission signal is detected by means of the interframe difference, the detection of the difference between next adjacent frames is not needed. When a large object moves quickly, the above-described after-effect must be considered. In such a case, it is ensured that the interframe difference is detected.

In the motion detector, the low pass filter derives the signal having the frequency component ranging from 0 to 4 MHz from the MUSE-II signal. When the interframe difference is faithfully derived from the signal thus derived, a frame memory must be provided.

Figure 22:
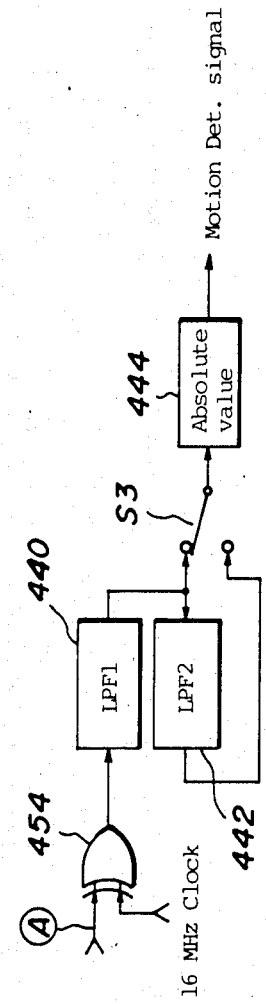
FIG. 22 is a block diagram showing another embodiment of the motion detector.

However, according to the circuit as shown in FIG. 22, the interframe difference is derived without the use of such a frame memory. Now referring to FIG. 22, reference numeral 454 denotes an exclusive OR gate which is used instead of the frame memory 436 and the subtractor 438 shown in FIG. 19. The exclusive OR gate 454 receives the signal A shown in FIG. 18 and a 16 MHz clock.

The signal A shown in FIG. 18 is such that the data of the present frame and the data of the preceding frame are interlaced every one clock at 32.4 MHz. Accordingly, when this signal is applied to the exclusive OR gate 454, it is reversed at every one clock of 16 MHz and consequently the interframe difference with a broad bandwidth (including the aliased portion) is obtained. The output signal from the exclusive OR gate 454 is applied to the first low pass filter 440. The first and second low pass filters 440 and 442, the switch S3 and the absolute value circuit 444 are activated in the manner described above with reference to FIG. 19. In this manner, the interframe difference can be obtained.

Figure 23:
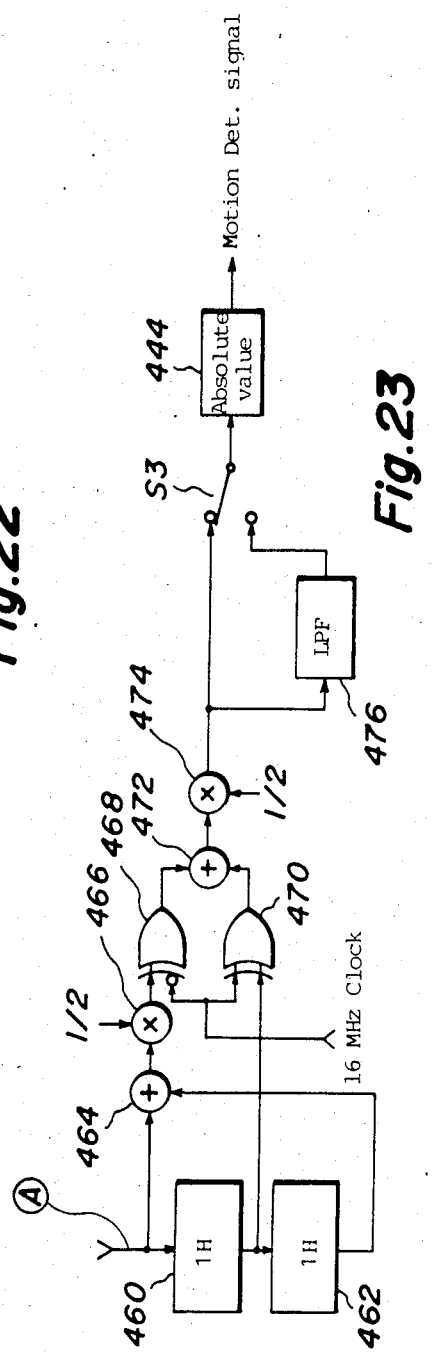
FIG. 23 is a block diagram of a further motion detector.

When the sample pattern in the MUSE-II signal is taken into consideration, a motion detection signal can be obtained by means of a circuit as shown in FIG. 23. In FIG. 23, reference nemerals 460 and 462 denote 1H (a horizontal scanning period) delay circuits; 464, an adder; 466, a ½ multiplier; 468, an exclusive OR gate having a inverting input terminal; 470, an exclusive OR gate; 472, an adder; 474, a ½ multiplier; and 476, a low pass filter with a cutoff frequency of 4 MHz.

By means of the circuit as shown in FIG. 23, it is possible to obtain as an interframe difference a broad bandwidth signal excluding the aliased portion from the signal A shown in FIG. 18.

More particularly, the signal A shown in FIG. 18 is reversed in the vertical direction and the sum of the signal A and the reversed signal is obtained by using the circuit shown in FIG. 23, so that the subsampling influence can be eliminated. The reason is that the phase of the sampling signal in the signal A shown in FIG. 18 is reversed at every 1H in the vertical direction and accordingly the present frame and the previous frame are interlaced at every 1H when viewed from the vertical direction.

In the MUSE-II transmission system, at least at the present time, the interframe difference detection cannot be utilized for a color signal. As a result, as far as the color signal is concerned, the difference between next adjacent frames is utilized, but as is well known in the art it is impossible to completely detect a motion.

It is, therefore, preferable that the color signal is controlled in accordance with the interframe difference obtained in connection with luminance signal or in accordance with the interframe difference signal thus obtained and the difference between next adjacent frames obtained connection with the color signal. This process is most preferable in practice because in general the color signal and the luminance signal have a high degree of correlation.

Figure 24:
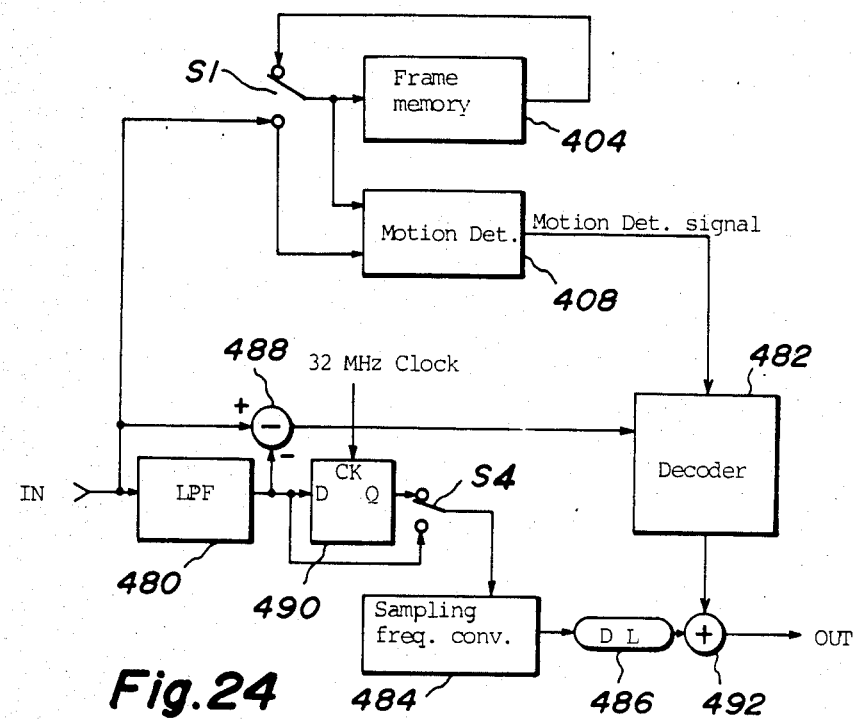
FIG. 24 is a block diagram showing another embodiment of a decoder on the receiver side for receiving a MUSE-II transmission signal.

FIG. 24 shows further embodiment of the present invention. According to this embodiment, the following problems resulting from the decoding of the MUSE-II transmission signal can be overcomes.

That is, in the MUSE-II decoder, a frame memory is required. Therefore, the noise reduction of the input signal is effected by means of this frame memory, so that a ratio between a carrier wave power and a noise power (to be referred to as "C/N" hereinafter) which is required for the transmission line can be reduced. However, the noise reduction of an input signal generally deteriorate a quality of a motion picture. Therefore, in the MUSE-II decoder, no noise reduction processing is effected on the moving portion of the input signal. Then, the determination whether the input signal represents a motion picture or a still picture becomes vague due to noise. Accordingly, even when a flat picture portion of an input picture is moving, the moving picture is erroneouly judged as a still picture. As a result, a picture portion which is determined as a still picture portion delays behind its actual movement. Therefore, when a camera is moved, the movement of the whole received picture becomes non-uniform.

Same is true for the decoding process in the MUSE-II system. The reson is that in the case of the decoding of the transmission signal, the temporal interpolation is utilized in a still picture portion, while the interfield interpolation is utilized in a motion picture portion. As a result, due to the misjudgement of the input signal, the flat picture portion of the input signal delays behind its actual movement.

Moreover, in the case of the decoding of the MUSE-II transmission signal, it is preferable that the sensitivity of the detection of a motion picture portion of an input signal be lower in order to obtain better quality of picture as a whole. As a consequence, the misjudgement tends to increase further.

On the other hand, in the case of the FM transmission or VSB-AM transmission, noise is mostly contained in a high frequency region of the transmission signal so that it is not required to reduce the noise level in a lower frequency band.

The MUSE-II transmission signal does not contain an aliased portion between the frames at a low frequency region (lower than 4 MHz). This fact may be utilized to solve the above-described problems, i.e.;

(1) Non-uniformity in motion of a picture of a transmission signal processed by a noise reducer; and (2) Non-uniformity in motion of a picture resulting from the decoding of a MUSE-II signal.

In addition to the above-descried problems, there exists a further problem in practice. That is, in the case of designing a two-dimensional filter used to execute the intrafield interpolation and the interfield interpolation of the MUSE-II transmission signal, it is impossible to obtain ideal two-dimensional filter characteristics, if the number of taps is less. As a consequence, the received picture is blurred.

The present invention can solve these problems.

FIG. 24 shows a fundamental circuit diagram which can overcome the above-described problems. In FIG. 24, reference numeral 480 denotes a low pass filter; 482, a decoder of the type described with reference to FIG. 18 with a motion detector being provided externally of this decoder 482; 484, a sampling frequency converter; 486, a delay line; 488, a subtractor; 490, a D type flip-flop. The clock at the frequency of 32 MHz is applied to the clock input terminal of the flip-flop 490. Reference numeral 492 designates an adder; and S4, a subsample shift switch.

The motion detection signal which is used in the decoder 482 in order to mix the motion and still pictures is generated by the subsample shift switch S1, the frame memory 404 and the motion detector 408.

The MUSE-II transmission signal is applied to the low pass filter 480, the subtractor 488 and the switch S1. The signal having a frequency component lower than 4 MHz is derived from the MUSE-II transmission signal by the low pass filter 480. In response to the MUSE-II transmission signal applied to the "+" input terminal and to the output signal from the low pass filter 480 applied to the "−" input terminal, the subtractor 488 forms a high frequency component complementary to the frequency component lower than 4 MHz. The thus obtained high frequency component is applied to the decoder 482.

The flip-flop 490 and the switch S4 adjust the phases of respective lines of the output signal from the low pass filter 480 and the signal from the switch S4 is applied to the sampling frequency converter 484 which converts the sampling frequency of the input signal to the same frequency as the sampling frequency of the output signal from the decoder 482. The delay line 486 delays the output signal from the sampling frequency converter 484 by a time delay of the output signal from the decoder 482.

The adder 492 adds the output signal from the delay line 486 to the output signal from the decoder 482, to obtain a desired television signal.

In the television signal thus reproduced, the low frequency component lower than 4 MHz has not passed through the decoder 482, so that non-uniformity of the motion of the picture resulting from the decoding or noise reduction can be eliminated and consequently the stability of the picture can be enhanced.

The high frequency component (higher than 4 MHz) of the MUSE-II transmission signal can be subjected to the stronger noise reduction process in the decoder than the prior art processing, so that the required C/N in the transmission path can be reduced.

Furthermore, the low frequency component (lower than 4 MHz) of the reproduced picture signal has not passed through the filter in the vertical direction, so that a vertical resolution can be remarkably enhanced. As a result, even when the vertical resolution is deteriorated due to incomplete interpolation of the high frequency component (higher than 4 MHz) of the reproduced picture signal in the decoder, the overall vertical resolution of the reproduced picture signal is not so badly deteriorated. In view of the visual perception, the vertical resolution of the horizontal low frequency component is important as is well known in the art.

Figure 25:
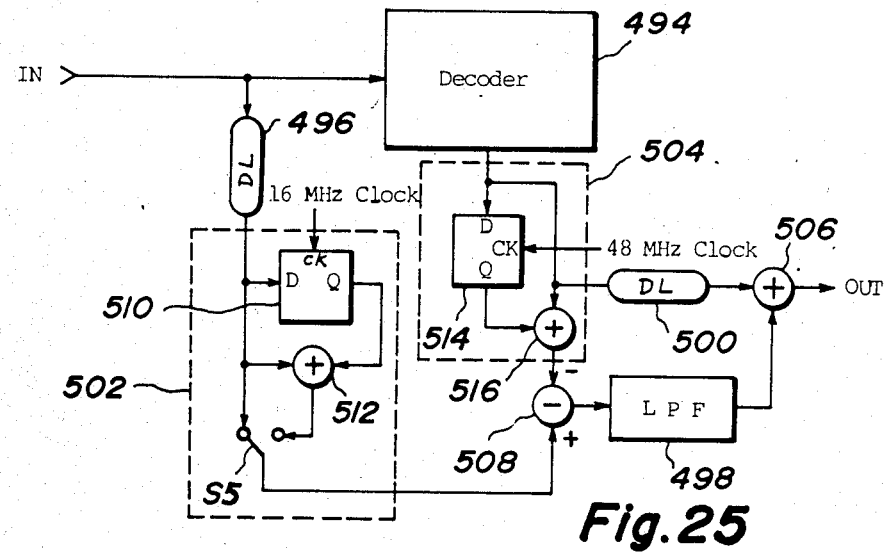
FIG. 25 is a block diagram showing a further embodiment of a decoder on the receiver side for receiving a MUSE-II transmission signal.

FIG. 25 shows an embodiment of an improved circuit arrangement for eliminating non-uniformity of the motion in the reproduced picture signal. In FIG. 25, reference numeral 494 denotes a decoder of the type described above with reference to FIG. 18; 496, a delay line; 498, a low pass filter permitting the passage of the frequency component lower than 4 MHz; 500, another delay line; 502, a subsampling shift circuit; 504, a phase coincidence circuit for coinciding a phase of the signal having a sampling frequency of 16 MHz with a phase of the signal having a sampling frequency of 48 MHz; 506, an adder; and 508, a subtractor.

The subsampling shift circuit 502 has a D flip-flop (whose clock frequency is 16 MHz) 510, an adder 512 and a subsampling shift switch S5. The phase coincidence circuit 504 has a D flip-flop 514 (whose clock frequency is 48 MHz) and an adder 516.

The MUSE-II transmission signal is applied not only to the delay line 496 but also to the decoder 494. The decoder 494 decodes the MUSE-II transmission signal and applies an output signal, i.e., a reproduced picture signal to the phase coincidence circuit 504. The MUSE-II signal derived from the delay line 496 is applied to the subsampling shift circuit 502, so that the phases of respective lines are coincided. The output from the circuit 502 is applied to the "+" input terminal of the subtractor 508. The output from the phase coincidence circuit 504 is applied to the "−" input terminal of the subtractor 508.

The phase coincidence circuit 504 adjusts the signal having the sapling frequency of 16 MHz derived from the subsampling shift circuit 502 to be the same phase with the signal having the sampling frequency of 48 MHz delivered from the decoder 494. The delay line 496 delays the input signal to the subsampling shift circuit 502 so that the output signal from the subsampling shift circuit 502 is delayed by a time delay of the output signal from the phase coincidence circuit 504.

The output from the subtractor 508 is applied through the low pass filter 498 to one of the two input terminals of the adder 506, while the output signal from the decoder 494 is applied through the delay line 500 to the other input terminal of the adder 506. The delay line 500 serves to make the two input signals to be applied to the adder 506 the same phase.

The low frequency (less than 4 MHz) component signal, which is not decoded, of the MUSE-II transmission signal is equivalently converted in accordance with a well-known Tellegen's Theorem. In an output signal derived from the adder 506, a signal portion of the reproduced picture signal from the decoder 594 which is aliased to a lower frequency bandwidth is cancelled by the output signal form the low pass filter 498.

Figure 26:
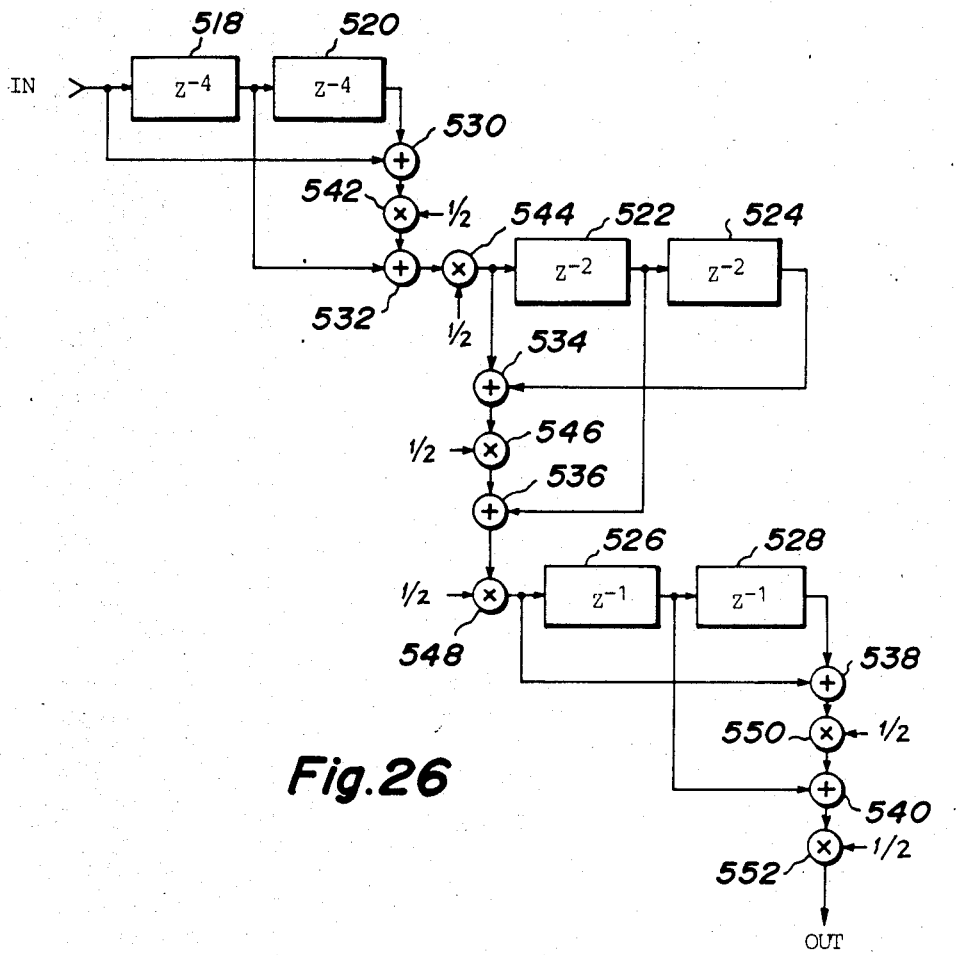
FIG. 26 is a block diagram showing an embodiment of the low pass filter shown in FIG. 25.

For instance, the low-pass filter 498 may be so designed and constructed as shown in FIG. 26. In FIG. 26, reference numerals 518, 520, 522, 524, 526 and 528 designate delay circuit whose power numbers (−4, −2, −1) indicate the number of picture elements to be delayed. Reference numerals 530, 532, 534, 536, 538 and 540 denote adders; 542, 544, 546, 548, 550 and 552, ½ multipliers.

Figure 27:
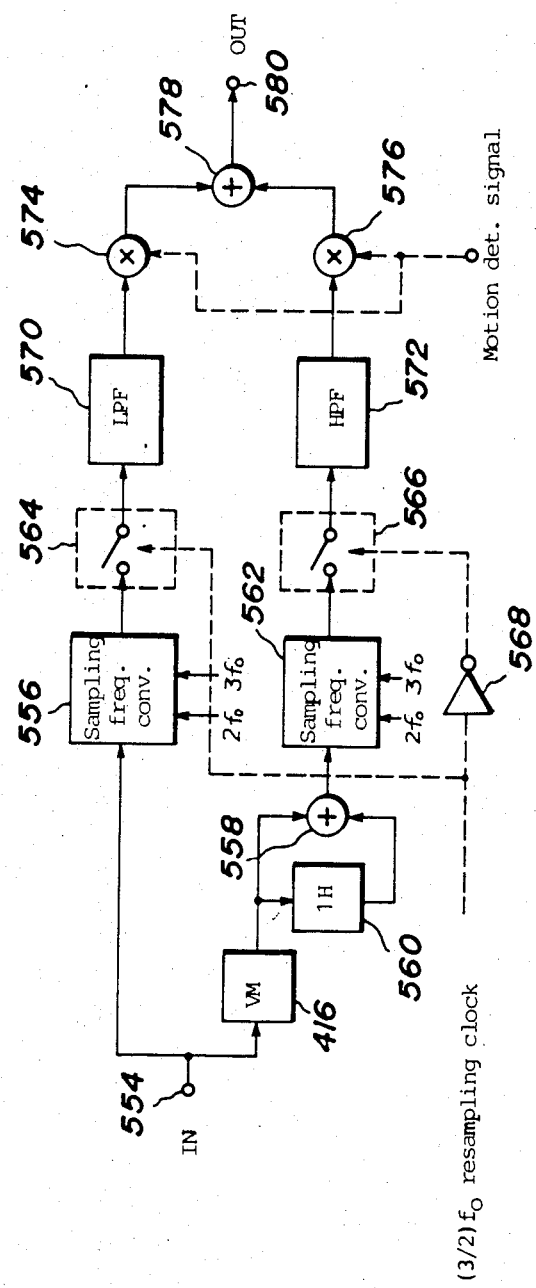
FIG. 27 is a block diagram showing an embodiment of the interfield interpolation filter.

The low pass filter of the type as shown in FIG. 26 does not need a coefficient circuit and is therefore very simple in construction. Moreover, as is well know in the art, the ½ multiplier can carry out the ½ multiplication only by means of the shift of bits so that it is also simple in construction FIG. 27 shows one embodiment of a circuit which embodies both the functions of the interfield interpolation filter 414 and the frequency conversion/mixer circuit 420. As shown in FIG. 27, the signal with the sampling frequency of 32 MHz derived from the mixer 412 (See FIG. 18) is applied via an input terminal 554 to a field memory 416 and a frequency converter 556.

The signal which is delayed by one field by the field memory 416 is applied to one of the two input terminals of the adder 558, while the delayed signal which is further delayed by one-horizontal-line by a one-line memory 560 is applied to the other input terminal of the adder 558. The output signal obtained from the adder 558 is applied to a sampling frequency converter 562.

The two frequency converters 556 and 562 convert the clock rate from 2fo (fo=16.2 MHz) to 3fo. The output signal with the sampling frequency of 3fo derived from the frequency converter 556 is applied to a re-sampling switch 564, while the output signal with the sampling frequency of 3fo derived from the sampling frequency converter 562 is applied to another re-sampling switch 566. The two resampling switches 564 and 566 modulate the input signals to "1" or "0" signal at the rate of 3fo (that is, the input signals are turned on and off at the frequency of 3fo). The re-sampling switch 564 is controlled by the re-sampling clock signal having a frequency of (3/2)fo, while the resampling switch 566 is controlled by the re-sampling signal having a frequency of (3/2) fo, supplied from an inverter 568.

The output signal from the re-sampling switch 564 is applied to a multiplier 574 through a low pass filter 570 having a pass bandwidth of 3 fo/4 (12 MHz). The output signal from the re-sampling switch 566 is applied to a multiplier 576 through a high pass filter 572 having a pass bandwidth of 3 fo/4 (12 MHz). The output signals form the multipliers 574 and 576 are added in an adder 578. The added result is applied through an output terminal 580 to the frequency converter/mixer 420 (FIG. 18).

In response to the output signal from the motion detector (See FIG. 18) which is applied to the multipliers 574 and 576, the mixing ratios between the output signal from the low pass filter 570 and the output signal from the high-pass filter 572 are so determined as to correspond to the movement of the picture.

Figure 28:
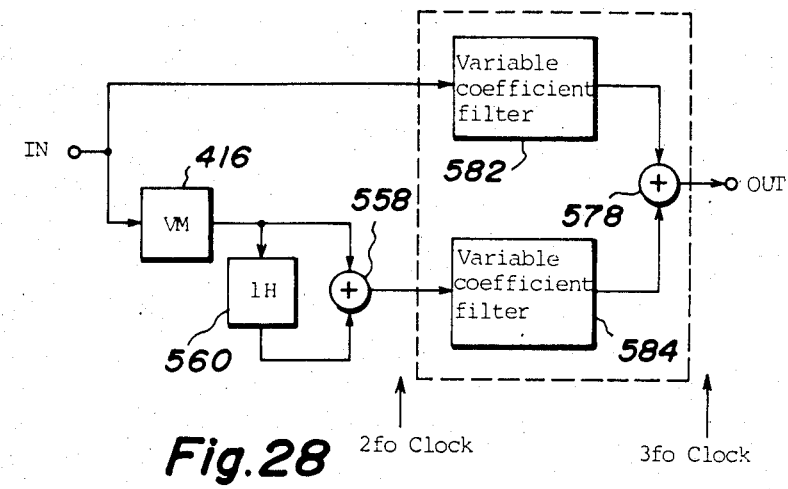
FIG. 28 is a block diagram showing another embodiment of the interfield interpolation filter.
Figure 29:
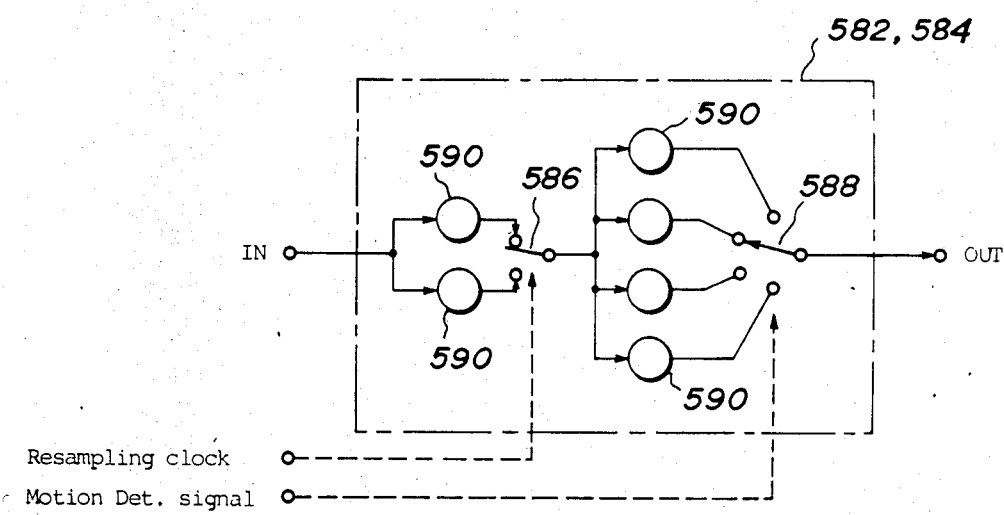
FIG. 29 is a circuit diagram showing an embodiment of the coefficient variable filter shown in FIG. 28.

FIG. 28 shows another embodiment of a circuit arrangement embodying both the functions of the interfield interpolation filter 414 and the frequency converter/mixer 420 and FIG. 29 shows a specific embodiment of a coefficient variable filter as shown in FIG. 28.

Referring to FIG. 25, the output signal having a sampling frequency of 32 MHz from the mixer 412 (See FIG. 18) is applied not only to the field memory 416 but also to a variable coefficient filter 582. The output signal from the adder 558 is applied to another variable coefficient filter 584.

Referring now to FIG. 29, the variable coefficient filter 582 (584) has two switches 586 and 588 and a plurality of coefficient circuits 590. The switch 586 is controlled by the re-sampling clock signal of (3/2) fo, while the switch 588 is controlled in response to the output signal from the motion detector 408 (See FIG. 18).

In general, a read only memory (ROM) can be used as a variable coefficient filter. If both the 3/2 fo sampling clock signal and the output signal from the detector 408 can be used as address inputs to the ROM, the variable coefficient filter can be realized only with one series of ROMs. It follows, therefore, that a plurality of one-dimensional variable coefficient filters can be assembled into one two-dimensional variable coefficient filter.

As described above, the frequency conversion, the re-sampling function and the interpolation can be carried out by one series of variable coefficient filters. As a result, the interfield interpolation filter can be made compact in size without degrading its performance.

According to the present invention, the interframe difference signal can be used when detecting a motion portion in the transmission system in which the interfield offset subsampling and the interframe offset subsampling are utilized, so that the detection accuracy is enhanced and the construction can be made simple.

Furthermore, the present invention has an advantage that even if an erroneous detection of a motion portion occurs, it will not cause any substantial deterioration in picture quality.

Moreover, according to the present invention, a motion of a picture in a MUSE-II transmission signal can be accurately detected, so that quality of a reproduced picture can be improved According to the present invention, non-uniformity in a motion of a picture resulting from the decoding of a reproduced picture signal and from the noise reduction can be eliminated, so that the stability of picture can be improved.

In addition, according to the present invention, a stable motion of a picture resulting from the compensation of a motion of a picture by an incomplete motion vector can be eliminated.

Furthermore, according to the present invention, a required C/N in a transmission line can be lowered.

According to the present invention, a picture signal having an excellent vertical resolution can be reproduced.

Finally, according to the present invention, the interfield interpolation filter can be made compact in size without causing any degradation of its performance.

What is claimed is:

1. An encoder for compressing a frequency band of a television signal of 2:1 interlace system by carrying out interfield offset subsampling and interframe offset subsampling, comprising:

first sampling means for carrying out interfield offset subsampling of a video signal of said television signal at a timing of a sampling pulse having a first sampling frequency corresponding to a substantially upper limit frequency of said video signal;

a low pass filter to which an output signal from said first sampling means is applied and for passing a signal component having an aliased portion resulting from said interfield offset subsampling, said low pass filter having a cut-off frequency substantially equal to one half ($\frac{1}{2}$) of said first sampling frequency; and second sampling means to which an output signal from said low pass filter is applied and for carrying out interframe offset subsampling of said output signal at a timing of a sampling pulse having a second sampling frequency which is lower than said first sampling frequency and is higher than one half of said first sampling frequency, so that a multiplexed subsampled transmission signal which does not include an aliased portion of reverse phase results from said interframe offset subsampling.

2. An encoder as claimed in claim 1, wherein a ratio between said first sampling frequency for carrying out said interfield offset subsampling and said second sampling frequency for carrying out interframe and interline offset subsampling is set to 3:2.

3. An encoder for transmitting a television signal by compressing a frequency band thereof by carrying out interfield offset subsampling and interframe offset subsampling, comprising:

an interfield prefilter to which an input video signal is applied and for transmitting a signal having a bandwidth corresponding to a first transmission characteristic;

first sampling means to which an output signal from said interfield prefilter is applied and for carrying out interfield offset subsampling of said output signal at a timing of a sampling pulse having a first sampling frequency;

a low pass filter to which an output signal from said first sampling means is applied and for passing a signal component having an aliased portion resulting from said interfield offset subsampling, and said low pass filter having a cut-off frequency substantially equal to one half ($\frac{1}{2}$) of said first sampling frequency;

first converter means to which an output signal from said low pass filter is applied and for converting a sampling frequency of said output signal into a different sampling frequency;

an interfield prefilter to which said input video signal is applied and for transmitting a signal having a bandwidth corresponding to a second transmission characteristic;

second converter means to which an output signal from said interfield prefilter is applied and for converting a sampling signal of said output signal into a different sampling frequency;

detector means for detecting a motion of a picture in response to said input video signal;

a mixer means for mixing output signals from said first and second converter means in accordance with an output signal from said motion detector means; and a second sampling means to which an output signal from said mixer means is applied and for carrying out interframe offset subsampling of said output signal at a timing of a sampling pulse having a second sampling frequency which is lower than said first sampling frequency and is higher than one half ($\frac{1}{2}$) of said first sampling frequency, so that a multiplexed subsampled transmission signal which does not include an aliased portion of reverse phase results from said interframe offset subsampling.

4. An encoder as claimed in claim 3, wherein a ratio between said first sampling frequency of said interfield offset subsampling and said second sampling frequency of interframe and interline offset subsampling is set to 3:2.

5. A decoder comprising:

means for receiving a multiplexed subsampled transmission signal which does not include an interframe aliased portion in a low frequency component;

a first interpolation means for carrying out interpolation processing of said multiplexed subsampled transmission signal to obtain a signal for a still picture portion;

a second interpolation means for carrying out intrafield interpolation processing of said multiplexed subsampled transmission signal to obtain a signal for a motion picture portion;

motion detection means for detecting an interframe difference of said multiplexed subsampled transmission signal to obtain a motion detection signal representative of an amount of picture movement; and a mixer means for linearly mixing said signal for a still picture derived from said first interpolation means and said signal for a motion picture derived from said second interpolation means in accordance with an amount of picture movement in a motion detection signal derived from said motion detection means.

6. A decoder as claimed in claim 5, wherein said first interpolation means comprises an interframe interpolation means for carrying out interframe interpolation of said multiplexed subsampled transmission signal and an interfield interpolation means for carrying out interfield interpolation of said multiplexed subsampled transmission signal.

7. A decoder as claimed in claim 6, wherein said mixer means comprises:

a first mixer means and a second mixer means;

said first mixer means linearly mixes an output signal derived from said interframe interpolation means and an output signal derived from said second interpolation means in accordance with said amount of picture movement in said motion detecting signal derived from said motion detection means;

said interfield interpolation means carries out interfield interpolation processing of a signal derived from said first mixer means; and said second mixer means linearly mixes a signal derived from said first mixer means and a signal derived from said interfield interpolation means in accordance with said amount of picture movement in said motion detection signal.

8. A decoder as claimed in claim 5, wherein said motion detection means comprises:

an interframe difference detection means for detecting an interframe difference of said multiplexed subsampled transmission signal;

low pass filter means having two selectable cutoff frequencies and for deriving a motion detection signal from an interframe difference signal derived from said interframe difference detection means, said two cut-off frequencies being a frequency including said aliased portion and a frequency not including said aliased portion;

a selection means for selecting one of said two cut-off frequencies of said low pass filter means;

detection means for detecting a difference between next adjacent frames of said multiplexed subsampled transmission signal; and output means for obtaining a compensation signal in response to a difference signal corresponding to said difference between next adjacent frames derived from said detection means, said compensation signal being applied to said selection means, so that said selection means responds to said compensation signal to select either one of said two cut-off frequencies.

9. A decoder as claimed in claim 8, wherein said output means has inhibit means responsive to a one-framedelayed signal of said interframe difference signal with respect to said multiplexed subsampled transmission signal for inhibiting said difference signal between next adjacent frames derived from said detection means; and said selection means is so controlled that a frequency which does not include said aliased portion is selected as a cutoff frequency of said low pass filter means when said inhibit means inhibits said difference signal.

10. A decoder as claimed in claim 8, wherein said interframe difference detection means includes means for reversing a signal derived from said interframe interpolation means at every half cycle of a clock signal having a interframe subsampling frequency.

11. A decoder as claimed in claim 8, wherein said interframe difference detection means includes means for removing said aliased portion in said multiplexed subsampled transmission signal.

12. A decoder comprising:
means for receiving a multiplexed subsampled transmission signal which does not include an interframe aliased portion in a low frequency component;

a first interpolation means for carrying out interpolation processing of said multiplexed subsampled transmission signal to obtain a signal for a still picture portion;

a second interpolation means for carrying out intrafield interpolation processing of said multiplexed subsampled transmission signal to obtain a signal for a motion picture portion;

motion detection means for detecting an interframe difference of said multiplexed subsampled transmission signal to obtain a motion detection signal representative of an amount of picture movement;

a mixer means for linearly mixing said signal for a still picture derived from said first interpolation means and said signal for a motion picture derived from said second interpolation means in accordance with an amount of picture movement in a motion detection signal derived from said motion detection means; and a signal processing means for applying an output signal derived from said mixer means as a decoded signal to a high frequency component in excess of said low frequency component of said multiplexed subsampled transmission signal and for applying said multiplexed subsampled transmission signal per se as said decoded signal to said low frequency component.

13. A decoder as claimed in claim 12, wherein said signal processing means comprises:
separation means for separating said low frequency component and said high frequency component from said multiplexed subsampled transmission signal, said separation means inputting a signal of said high frequency component of said multiplexed subsampled transmission signal to said first and second interpolation means; and adder means for adding said output signal derived from said mixer means to a signal of said low frequency component in said multiplexed subsampled transmission signal derived from said separation means.

14. A decoder as claimed in claim 12, wherein said signal processing means includes means for replacing a low frequency component in said output signal derived from said mixer means with said low frequency component signal in said multiplexed subsampled transmission signal.

* * * * *